(12) United States Patent
Odom et al.

(10) Patent No.: US 8,415,240 B1
(45) Date of Patent: Apr. 9, 2013

(54) MESOSCALE PYRAMIDS, HOLE ARRAYS AND METHODS OF PREPARATION

(75) Inventors: Teri W. Odom, Chicago, IL (US); Joel A. Henzie, Evanston, IL (US); Eun-Soo Kwak, San Jose, CA (US); Min Hyung Lee, Skokie, IL (US)

(73) Assignee: Northwestern University, Evanston, IL (US)

(*) Notice: Subject to any disclaimer, the term of this patent is extended or adjusted under 35 U.S.C. 154(b) by 0 days.

(21) Appl. No.: 13/209,767

(22) Filed: Aug. 15, 2011

Related U.S. Application Data

(60) Division of application No. 11/493,254, filed on Jul. 26, 2006, now Pat. No. 7,999,353, which is a continuation-in-part of application No. 11/411,594, filed on Apr. 26, 2006, now Pat. No. 8,048, 789.

(60) Provisional application No. 60/702,646, filed on Jul. 26, 2005, provisional application No. 60/674,786, filed on Apr. 26, 2005.

(51) Int. Cl.
*H01L 21/20* (2006.01)
(52) U.S. Cl.
USPC ..... 438/584; 438/670; 257/618; 257/E21.038
(58) Field of Classification Search ........... 438/576, 438/577, 597, 670, 584; 257/618, 622, 698, 257/E21.597, E21.025, E21.034, E21.038
See application file for complete search history.

(56) References Cited

U.S. PATENT DOCUMENTS

| | | | |
|---|---|---|---|
| 4,116,720 A | | 9/1978 | Vinson |
| 4,337,115 A | * | 6/1982 | Ikeda et al. ............ 438/670 |
| 4,685,996 A | | 8/1987 | Busta et al. |
| 5,191,217 A | * | 3/1993 | Kane et al. ............ 250/423 F |
| 5,328,559 A | | 7/1994 | Jerman |
| 5,529,950 A | | 6/1996 | Hoeniein et al. |
| 5,554,488 A | * | 9/1996 | Rioux ............ 430/315 |
| 5,955,749 A | | 9/1999 | Joannopoulos et al. |
| 5,980,119 A | | 11/1999 | Furuyama |
| 6,051,485 A | * | 4/2000 | Schindler et al. ............ 438/577 |
| 6,334,856 B1 | | 1/2002 | Allen et al. |
| 6,640,034 B1 | | 10/2003 | Charlton et al. |
| 6,746,825 B2 | | 6/2004 | Nealey et al. |
| 7,078,690 B2 | | 7/2006 | Simon et al. |
| 7,194,174 B2 | | 3/2007 | Dridi et al. |
| 7,247,349 B2 | | 7/2007 | Ozin et al. |
| 2004/0114502 A1 | | 6/2004 | Takahashi et al. |
| 2007/0196571 A1 | | 8/2007 | Ozin et al. |

OTHER PUBLICATIONS (Qiaobing Xu et al., "Fabrication of Free-Standing Metallic Pyramidal Shells", Nano Letters, 2004, vol. 4, No. 12, 2509-2511).*
Grupp, De; Lezec, HJ; Thio, T; and Ebbesen, TW; Beyond the Bethe Limit: Tunable Enhanced Light Transmission Through a Single Sub-Wavelength Aperture; Advanced Materials, 1999 860-862, 11 (10).
Yin, L; Vlasko-Vlasov, VK; Rydh, A; Pearson, J; Welp, U; Chang, SH; Gray, SK; Schatz, GC; Brown, DB; and Kimball, CW; Surface plasmons at single nanoholes in Au films; Applied Physics Letters, Jul. 19, 2004, 467-469, 85 (3).

(Continued)

*Primary Examiner* — Khiem D Nguyen
(74) *Attorney, Agent, or Firm* — Reinhart Boemer Van Deuren S.C.

(57) ABSTRACT

Composite films comprising two-dimensional hole arrays, and related methods of preparing hole arrays.

5 Claims, 19 Drawing Sheets

OTHER PUBLICATIONS

Greyson, EC, Babayan, Y; and Odom, TW; Directed Growth of Ordered Arrays of Small-Diameter ZnO Nanowires; Advanced Materials, Aug. 4, 2004; 1348-1352, 16 (15).

Odom, TW; Thalladi, VR; Love, JC and Whitesides, GM; Generation of 30-50 nm Structures Using Easily Fabricated, Composite PDMS Masks, J. Am. Chem. Soc., Sep. 21, 2002, 12112-12113, 124 (41).

Odom, TW; Love, JC; Wolfe, DB; Paul, KE and Whitesides, GM; Improved Pattern Transfer in Soft Lithography Using Composite Stamps; Langmuir, Jun. 25, 2002, 5314-5320, 18 (13).

Liu, B and Zeng, HC; Room Temperature Solution Synthesis of Monodispersed Single-Crystalline ZnO Nanorods and Derived Hierarchical Nanostructures; Langmuir, May 11, 2004, 4196-4204, 20 (10).

Love, JC; Gates, BD; Wolfs, DB; Paul, KE; and Whitesides, GM; Fabrication and Wetting Properties of Metallic Half-Shells with Submicron Diameters; Nano Letters, 2002, 891-894, 2 (8).

Xu, Q; Tonks, I; Fuerstman, MJ; Love, JC; and Whitesides, GM; Fabrication of Free-Standing Metallic Pyramidal Shells; 2004, 2509-2511, 4 (12).

Chang, SH; Gray, SK; and Schatz, GC; Surface Plasmon Generation and Light Transmission by Isolated Nanoholes and Arrays of Nanoholes in Thin Metal Films; Optics Express, Apr. 18, 2005, 3130-3165, 13 (8).

Hecht, B; Bielefeldt, H; Novotny, L; Inouye, Y; and Pohl, DW; Local Excitation, Scattering, and Interference of Surface Plasmons; Physical Review Letters, Aug. 26, 1996, 1889-1892, 77 (9).

Koerkamp, KJK; Enoch, S; Segerink, FB; Van Hulst, NF; and Kuipers, L; Strong Influence of Hole Shape on Extraordinary Transmission through Periodic Arrays of Subwavelength Holes; Physical Review Letters; May 7, 2004, 183901-1-183901-4, 92 (18).

Jin, R; Cao YW; Mirkin, CA; Kelly, KL; Schatz, GC; and Zheng, JG; Photoinduced Conversion of Silver Nanospheres to Nanoprisms; Science, Nov. 30, 2001, 1901-1903, 294.

Prodan, E; Radloff, C; Malas, NJ; and Nordlander, P; A Hybridization Model for the Plasmon Response of Complex Nanostructures; Science, Oct. 17, 2003, 419-422, vol. 302.

Childs, WR and Nuzzo, RG; Large-Area Patterning of Coinage-Metal Thin Films Using Decal Transfer Lithography, Langmuir, 2005, 195-202, 21 (1).

Lu, Y; Liu, GL; Kim, J; Mejia, YX; and Lee, LP; Nanophotonic Cresent Moon Structures with Sharp Edge for Ultrasensitive Biomolecular Detection by Local Electromagnetic Field Enhancement Effect; Nano Letters, 2005, 119-124, 5 (1).

Kwak, ES; Henzi, J; Chang, SH; Gray, SK; Schatz, GC; and Odom, TW, Surface Plasmon Standing Waves in Large-Area Subwavelength Hole Arrays; Nano Letters, 2005, 1963-1967, vol. 5, No. 10.

Barnes, WL; Dereux, A; and Ebbesen, TW; Review Article Surface Plasmon Subwavelength Optics; Nature, Aug. 14, 2003, 824-830, vol. 424.

* cited by examiner

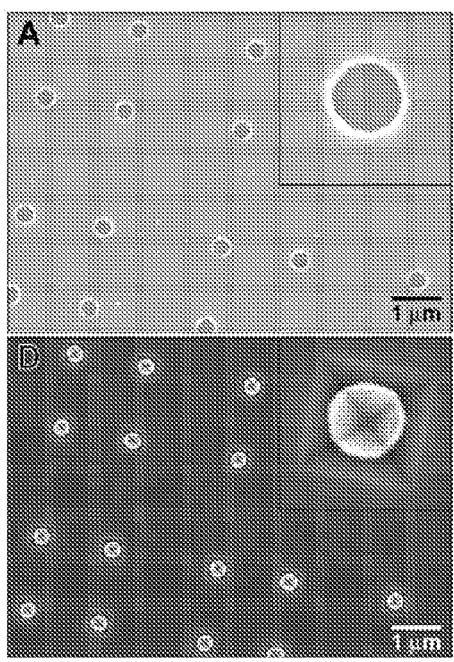
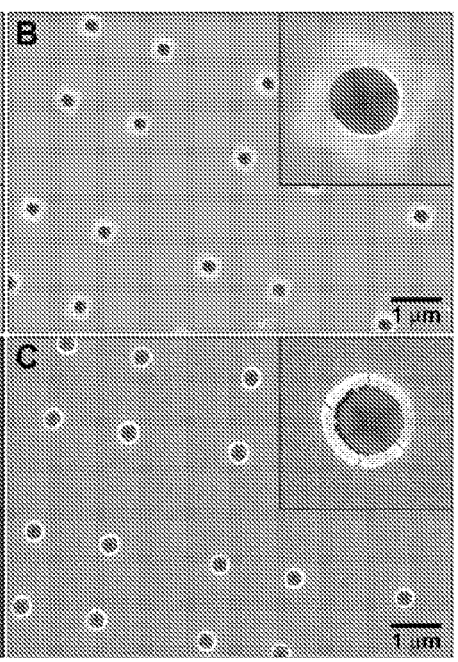
Fig. 2A                     Fig. 2B
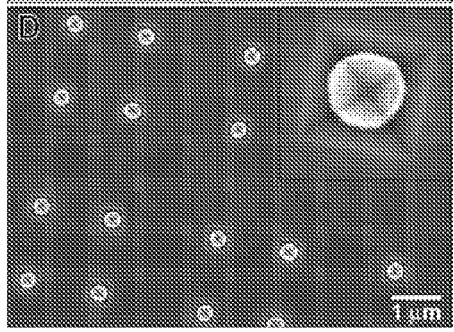
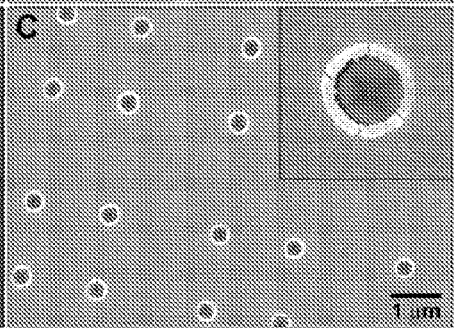
Fig. 2D                     Fig. 2C Fig. 6A   Fig. 6B
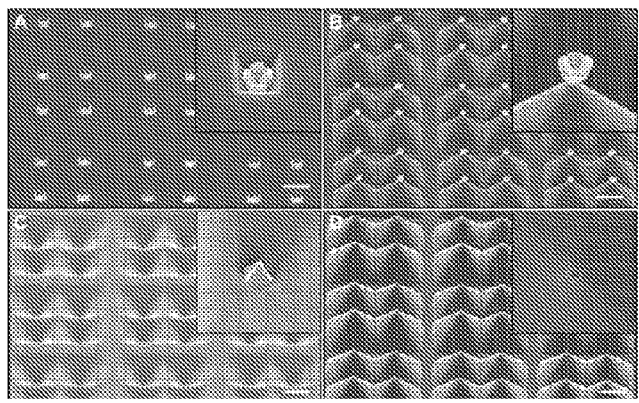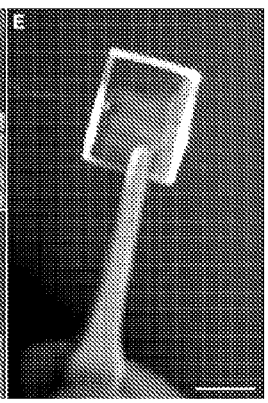
Fig. 6C   Fig. 6D   Fig. 6E Fig. 8A
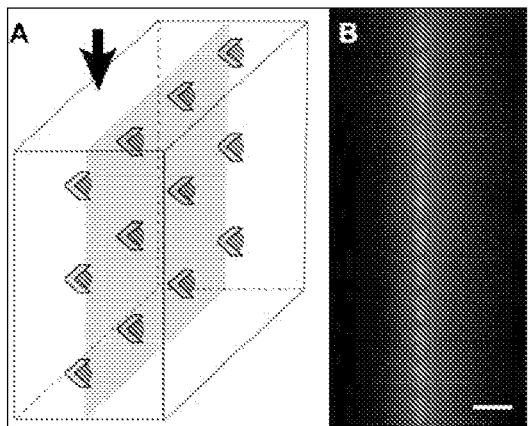
Fig. 8B
Fig. 8C
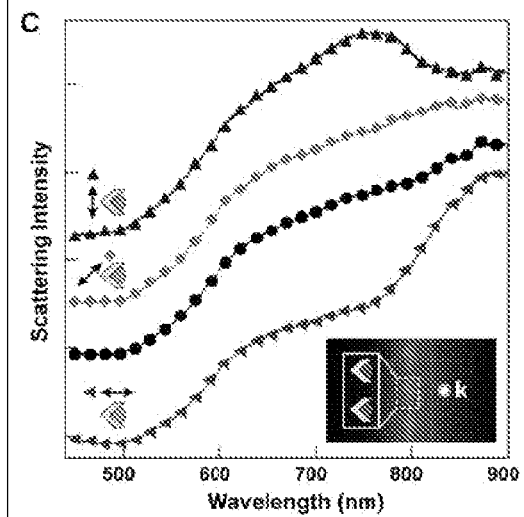

(160)

(180), (200)

(220)

(240)

(260), (280)

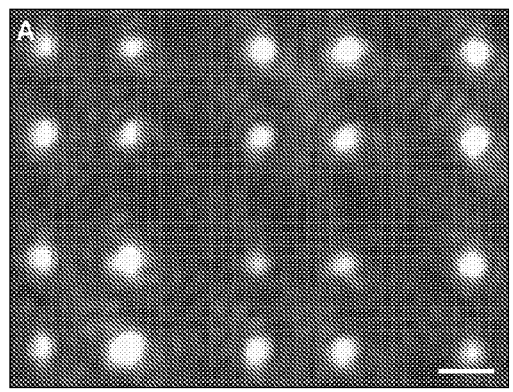
Fig. 11A
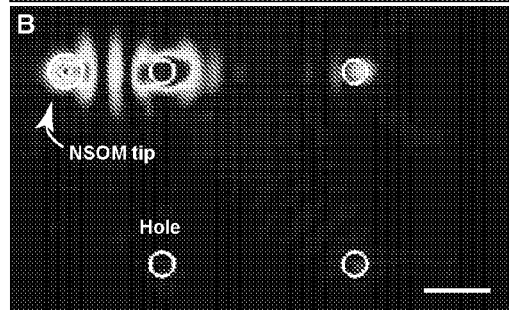
Fig. 11B
Fig. 11C
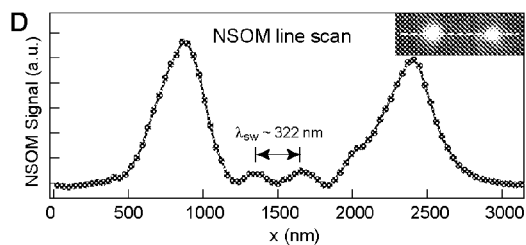
Fig. 11D

Fig. 14A
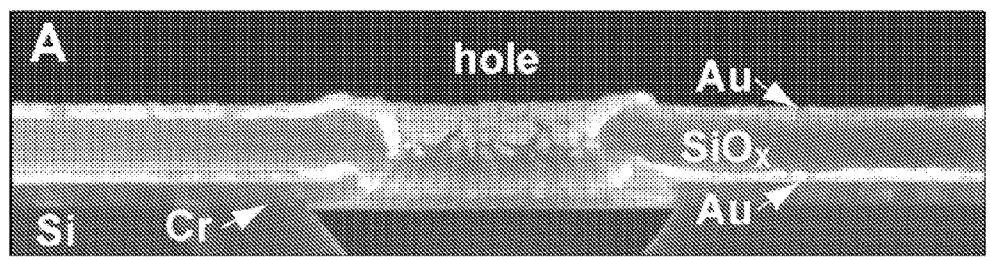
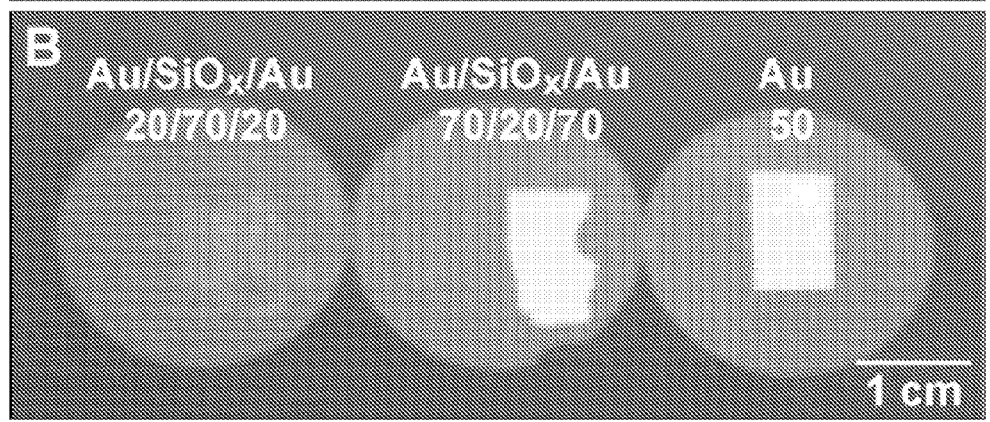
Fig. 14B

Fig. 16A    Fig. 16B
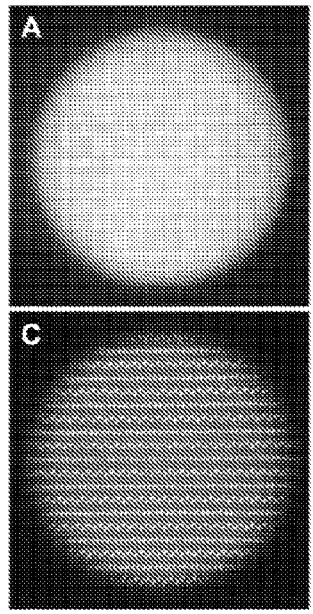 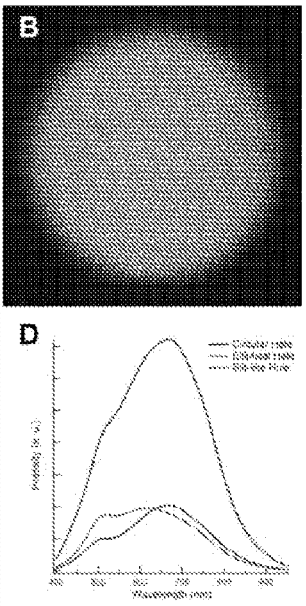
Fig. 16C    Fig. 16D

Fig. 17A    Fig. 17B    Fig. 17C    Fig. 17D
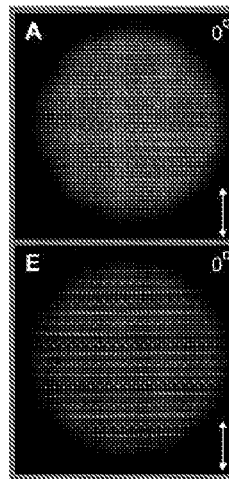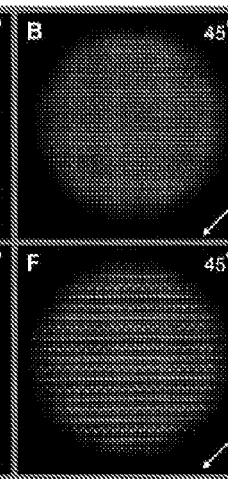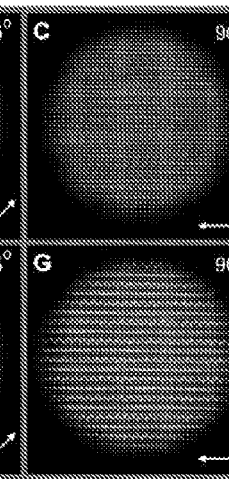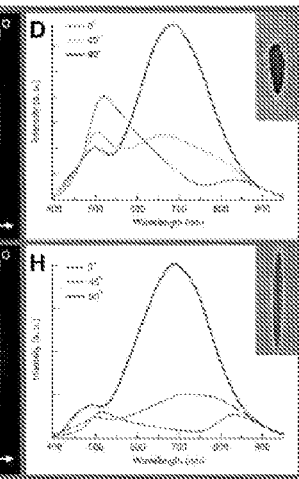
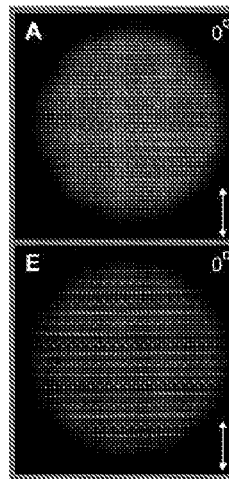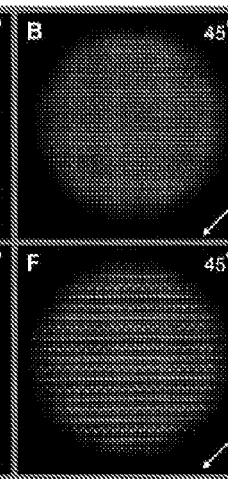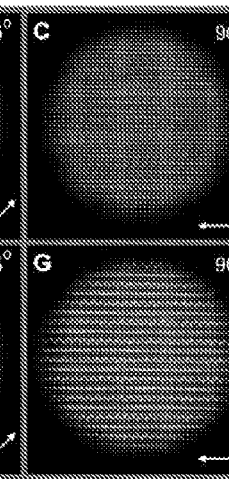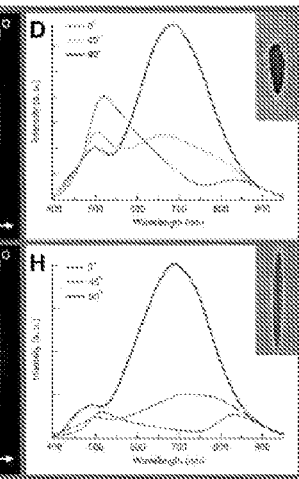
Fig. 17E    Fig. 17F    Fig. 17G    Fig. 17H Fig. 19A
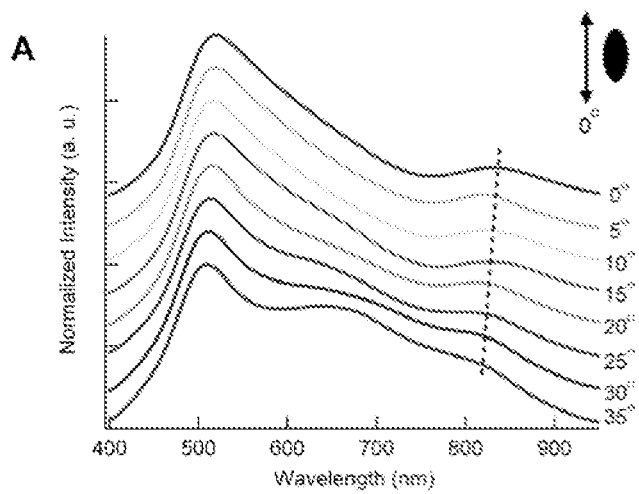
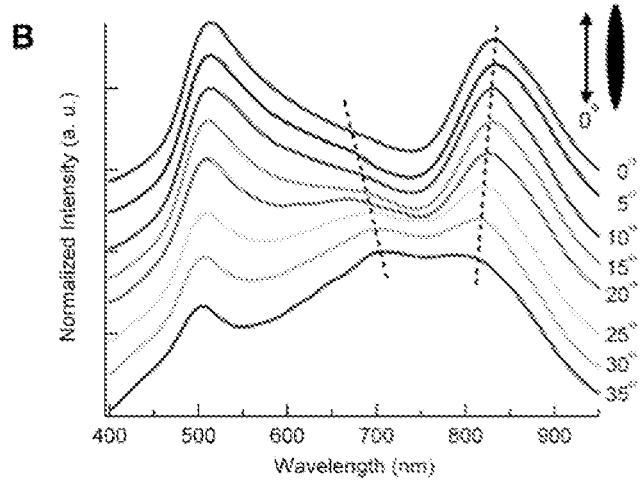
Fig. 19B

MESOSCALE PYRAMIDS, HOLE ARRAYS AND METHODS OF PREPARATION

This application is a divisional of and claims priority benefit from application Ser. No. 11/493,254 filed Jul. 26, 2006, issued as U.S. Pat. No. 7,999,353, which is a continuation-in-part and claims priority benefit from application Ser. No. 11/411,594, filed Apr. 26, 2006, issued as U.S. Pat. No. 8,048,789, by way of prior provisional application Ser. No. 60/674,786, filed Apr. 26, 2005, and provisional application Ser. No. 60/702,646, filed Jul. 26, 2005, each of which is incorporated herein by reference by its entirety.

This invention was made with government support under grant number NCC-2-1363 awarded by the National Aeronautics and Space Administration (NASA). The government has certain rights in the invention.

BACKGROUND OF THE INVENTION

The optical properties of metallic nanoparticles and hole arrays continue to draw interest because of their fundamental science and potential for emerging applications. For example, such structures can be used over a range of wavelengths from the ultraviolet to the near-infrared in the research and development of nanoscale photonics, chemical and biological sensing, high-efficiency photovoltaic devices and related applications. Electromagnetic radiation can interact with metallic nanoparticles through the resonant excitation of their surface free electrons. These collective electron density oscillations, known as surface plasmons (SPs), are confined to a finite volume, and are sensitive to the size, shape and dielectric environment of a nanoparticle or hole structure.

With regard to metallic particles, both solution-based syntheses and fabrication techniques have been used in the art. Most research efforts have focused on the chemical synthesis of nanoparticles because the preparative techniques are relatively straightforward; the size and shape of nanoparticles can be tailored by controlling conditions such as reaction temperature, surfactants, and concentrations of precursors. Spherical particles with sizes less than 50 nm support single LSP resonances that are dipolar in character. Accordingly, their optical properties can be explained reasonably well by the lowest order term in Mie theory. In contrast, larger metallic particles (diameters >100 nm) with anisotropic shapes can exhibit multiple LSP resonances that correspond to higher order modes. Disordered assemblies of 100-nm Ag particles imbedded in poly(dimethylsiloxane) (PDMS) films showed a dipole resonance as well as a quadrupole resonance as the film was stretched in two-dimensions. Solution-phase synthesis often provides a flexible route to size and shape control of metallic nanoparticles, which can in turn provide tuning and control of their respective optical properties. However, a common drawback of such solution-based preparations, especially with regard to synthesis of noble metal nanoparticles, is the formation of various other shapes in addition to the desired particulate configuration.

Sacrificial templates have been employed in the art for molding the size and shape of free-standing nano- and mesostructures. Typically, solid and supported structures, such as nm-sized pores in anodized alumina membranes or μm-sized etched pits in silicon are used. Electro-deposition of conducting materials or molding of polymers reproduces the shape and structure of the template; the templates are then removed by the appropriate etchants. Free-standing structures such as metallic (and multi-layered) rods, pyramidal tips for scanning probe applications, and μm-sized metallic pyramidal shells have been produced. The μm-sized pyramidal shells, for instance, were found to exhibit tips with radius of curvature r as small as 50 nm. Other types of templates, including silica spheres, have recently been used to fabricate metallic structures with unusual shapes. Such structures were generated by e-beam deposition of metal onto silica spheres followed by etching of the sphere-template. Sub-micron "half-shells" made from different metals as well as "crescent moon" structures with sharp edges in silver were also produced. The edges of these silver shell-structures enhanced the local electromagnetic field, and the Raman scattering of Rhodamine 6G from isolated, individual crescent moon structures could be detected.

Investigations of sub-micron particles have only recently been possible through improved chemical methods and fabrication techniques to generate particles with uniform size and shape. Although multipolar LSP resonances have been seen in the extinction spectra of sub-micron particles, the random dispersion of the particles in solution ensured that all resonant plasmon modes were measured simultaneously, and some peaks were obscured because of polarization averaging. Multipolar excitations can, however, depend on the direction of the propagation wavevector and polarization vector; thus, certain excitation angles can make selected resonances more pronounced. To correlate the orientation of the particles with specific plasmon modes directly, strategies that can both isolate particles and control their orientation are essential. Drop-coating or spin-casting dilute colloidal solutions onto glass slides have resulted in isolated particles although their orientation on the substrate was not well-defined, and the optical properties could only be related to particle shape in a non-uniform dielectric environment. Electron-beam lithography can create individual particles with a controlled orientation, although the shapes are limited to two-dimensional planar structures.

The observation of enhanced transmission through sub-wavelength hole arrays has also generated considerable interest. Such arrays make possible new fundamental studies of SP interactions with periodic structures and novel technologies including spectroscopically based chemical and biological sensors and photonic devices. To date, the most common method to fabricate hole arrays is focused ion beam (FIB) milling, a serial and low throughput approach that can control the diameter and spacing of the holes with reasonable precision. Free-standing suspended films have been fabricated by FIB and reactive ion etching, but the generation of multi-layered films is challenging and laborious and has been limited to only a few metals. No technique has been developed for producing optical quality hole arrays in a parallel fashion out of multiple materials and certainly not in areas larger than hundreds of square microns. Increased access to and expanded capabilities of these nanostructured films are critical for in practical photonic devices and in biological and chemical sensing applications. As with nanoparticles, there is an on-going search in the art for a facile, efficient method of preparing suitable hole array structures.

The transmission of light through films of nanohole arrays depends strongly on the shape of the hole because only wavelengths of light that are resonant with the SP can be transmitted through hole arrays with appreciable intensity. Most studies to date have focused on the optical properties of circular or slightly oblong hole arrays on small pitches in Ag films fabricated by FIB. (See, Ebbesen et al. *Nature* 2003, 424, 824-830; and Ebbesen et al. *Adv. Mater.* 1999, 11, 860-862.)

Holes, compared with particles, offer unique opportunities to investigate the effects of polarization on their localized surface plasmon resonance (LSPR). For example, several reports showed shape-dependent enhanced transmission through hole arrays with different polarization of incident light. Rectangular hole arrays exhibited more dependence on polarized light and increased transmission compared to circular or square hole arrays. It is anticipated that nanoholes and nanoparticles are complementary structures, although most work to date has focused only on circular holes and disks. FIB can control the shape of the holes with reasonable precision; however, this serial process cannot easily generate free-standing films or hole shapes having sharp corners or edges of high curvature. Again, the art continues the search for facile fabrication of hole arrays over a range of hole shapes and configurations.

SUMMARY OF THE INVENTION

In light of the foregoing, it is an object of the present invention to provide metallic pyramidal particulates, hole arrays and method(s) for their preparation and/or assembly, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It can be an object of the present invention to provide a method of preparing nanodimensioned pyramidal particulates with control over shape and size.

It can be another object of the present invention, alone or in conjunction with the preceding, to provide one or more methods for preparation of particulates free-standing or having a fixed orientation, depending on end-use application or subsequent characterization.

It can be another object of the present invention, with regard to a fixed orientation, to provide a method to coordinate controlled preparation with fabrication of a two-dimensional array of such nanodimensioned particulates, to preserve orientation, alignment and order.

It can be another object of the present dimension to provide a composite comprising such an array, which can be manipulated, by hand, to facilitate full characterization of the optical properties of such particles.

It can be another object of the present invention to provide a general method for the fabrication for large-area free-standing films of subwavelength hole arrays, with high throughput with accurate hole dimension and precision spacing.

It can be another object of the present invention to provide a parallel approach to such a general methodology, for the generation of multi-layered and/or multi-material films.

It can also be an object of the present invention, alone or in conjunction with one or more of the preceding objectives, to provide one or more such films, of appropriate optical quality, for use in the study and implementation of surface plasmon phenomena.

Other objects, features, benefits and advantages of the present invention will be apparent from this summary and the following description of certain embodiments, and will be readily apparent to those skilled in the art having knowledge of anisotropic nanoparticle shapes and configurations, fabrication and related plasmon resonance modes. Such objects, features, benefits and advantages will be apparent from the above as taken into conjunction with the accompanying examples, data, figures and all reasonable inferences to be drawn therefrom, alone or with consideration of the references incorporated herein.

In part, this invention can be directed to a method of preparing a pyramidal particulate. Such a method can comprise providing a substrate and a mask thereon, with the mask comprising at least one aperture therethrough; anisotropically treating the substrate through the aperture and under the mask to provide a pyramidal recess in the substrate; and depositing a layer of a first material component on the recess surface, to provide a pyramidal particulate therein. Such a method can comprise use of an Si(100) substrate, anisotropic treatment of which can provide single crystalline Si(111) facets. In conjunction with a mask of the sort illustrated below, metallic and other material components can be deposited thereon, using techniques described herein, to provide a particulate comprising a pyramidal shell configuration, removable from the substrate recess.

Choice of material component is limited only by use in conjunction with a particular deposition technique, providing desired rate and control of material placement. Without limitation, electron beam deposition techniques known in the art can be used with good effect to deposit a variety of metallic and/or magnetic materials, as well as other materials such as silicon and silicon oxide—through the mask and onto a recess surface. Such materials include but are not limited to gold, nickel, silver and combinations thereof. With regard to the latter, sequential deposition of one or more additional material components can provide particulates having a corresponding layered pyramidal shell configuration. Regardless, the first material component, upon substrate removal, can be functionalized or compositionally modified for further chemistry or subsequent use, employing synthetic techniques well known to those skilled in the art.

Such particulates can be dimensionally-controlled by variation of mask aperture dimension. In certain embodiments, such an aperture can be about 100 nm or less. In certain embodiments, aperture diameter can be about 250 nm or greater. Variations thereof between such parameters, together with time and rate of material deposition, can be used to control layer thickness and basal dimensions of the resulting pyramidal shells. Regardless, depending upon a particular fabrication technique, a mask can comprise a plurality of apertures, whether random or ordered, for mass production of such particulates. In certain embodiments, again depending on mask configuration, a substantially two-dimensional array of apertures can be used to provide a corresponding array of pyramidal recesses in the substrate, for material deposition.

If not removed from the substrate, an array of such pyramidal particulates can function as a mask for further fabrication. In such embodiments, the substrate can be anisotropically treated to remove the substrate from around the particulates, providing them positioned on the substrate at or about the pyramidal tips. Contacting the particulates with a resinous matrix material can be used to remove them from the substrate surface. In certain embodiments, such a material can be optically transparent and/or functionally dielectric, such that a well-ordered two dimensional array of particles positioned therein, with substantially uniform orientation and alignment, can be used for characterization of orientation-dependant optical properties of such particulates.

Accordingly, various methods of this invention can comprise one or more microscopic and/or spectroscopic analyses of such pyramidal particulates, such analyses as can be facilitated by preservation of a fabricated two-dimensional array of such particulates. Such an array can be then oriented about (e.g., parallel or perpendicular to) an axis of irradiation in conjunction with such an analysis. Such irradiation as can be polarizable and varied by wavelength. Such methods can be used to correlate orientation of the pyramidal particulates with illumination wave vector and/or polarization vector. Various other analytic techniques and end-use applications of such pyramidal particulates and/or arrays will be known to and understood by those skilled in the art made aware of this invention.

Accordingly, the present invention can also be directed to a composite comprising a dielectric component and a two-dimensional substantially planar array of metallic pyramidal components. As described above, such components can be uniformly oriented within the dielectric component, for further optional use or analysis. Such components can comprise one or more materials of the sort described elsewhere herein. Material choice is limited only by deposition technique in conjunction with the present method(s) and/or the utility of the resulting anisotropic configuration and related plasmon resonance modes. Regardless, in certain embodiments, such pyramidal components can comprise a noble metal or multiple layers of a combination of such metallic materials.

Without limitation as to material choice or composition, each layer of such a pyramidal component can comprise a variable thickness dimension, depending upon rate and time of deposition. In certain embodiments, without limitation, such a thickness dimension can range from about 10 nm to about 50 nm or more. Regardless, depending upon substrate recess volume, mask aperture diameter and other fabrication parameters of the sort described herein, the resulting pyramidal components can comprise a basal dimension up to about 300 nm, and/or can have a tip radius of curvature ranging from less than about 2 nm to about 15 nm. In certain embodiments, depending upon subsequent end-use application or analyses, such pyramidal particulates can comprise a basal dimension ranging from about 100 nm to about 250 nm, and/or can have a tip radius of curvature less than about 10 nm.

Depending upon dimension of the dielectric component and one or more of the aforementioned fabrication techniques, such a composite can comprise up to about $10^9$ or more pyramidal particulates per square inch of dielectric component, such a value depending at least in part on pyramidal dimension. Regardless, the dielectric component can have a dimension limited only by composite fabrication and a thickness dimension convenient for subsequent use or analysis. Typically, without limitation, such a dielectric component can comprise a film up to about 15 microns thick. PDMS is one non-limiting material as can be used as a dielectric component. Composites of this invention can comprise various other materials, optically-transparent and/or providing dielectric function, as would be known to those skilled in the art made aware of the present invention.

Accordingly, this invention can also be directed to method of fabricating a two-dimensional array of pyramidal metallic particulates. Such a method can comprise providing a substrate and a mask thereon, with the mask comprising a plurality of apertures therethrough; treating the substrate through the apertures and under the mask with an anisotropic etchant, to provide a plurality of pyramidal recesses in the substrate; depositing at least one metallic component on the pyramidal recess surfaces, with deposition at a rate and/or for a time sufficient to provide a layer of the metallic component(s) thereon; treating the substrate with an anisotropic etchant, to provide a substrate configuration supporting a two-dimensional array of the resulting pyramidal metallic particulates at about the tips thereof; and at least partially incorporating such particulates within a planar dielectric material.

As discussed above, electron beam deposition techniques known in the art can be used herewith. Depending upon control of one or more deposition parameters, a metallic component can be deposited on a surface area less than the total surface area of a substrate recess. For instance, in certain embodiments, notwithstanding recess dimension, deposition control can provide a pyramidal configuration adjustably dimensioned smaller than the corresponding recess. Regardless, a combination of metallic components can be sequentially deposited, each such deposition controlled to provide variable component-by-component layer thickness.

As illustrated below, the resulting two-dimensional array can be incorporated into a dielectric, optically transparent component and used to characterize orientation dependent optical properties of the incorporated metallic particulates. Alignment of the array with or at an angle to an axis of irradiation can be used to facilitate various microscopic and spectroscopic analyses. Polarizable and/or wavelength variable irradiation can be used as described herein to correlate orientation of the pyramidal metallic particulates with illumination wave vectors and/or polarization vectors, as can be used to further understand a relationship(s) between the three-dimensional configuration of such particles and their plasmon resonance modes.

In part, this invention can be directed to a method of preparing an array of nano-dimensional holes or apertures in a material film. Such a method can comprise providing a substrate and a mask component thereon, with the mask comprising at least one hole or aperture therethrough; anisotropically treating the substrate through the aperture to provide a recess in the substrate; and depositing a layer of a first material component on the mask component. In certain embodiments, each said aperture, without limitation as to shape or configuration, can independently have a dimensional aspect ranging from about 100 nm to about 250 nm. As described elsewhere herein, aperture/hole dimension can be reduced or enlarged, with spacing varied, limited only by available fabrication techniques enroute to mask formation. As illustrated below, metallic and other material components can be deposited on the mask component, using techniques described herein, to provide one or more material layers thereon. In certain embodiments, a second material layer and, optionally, a third, or optionally, additional material layer(s) can be sequentially deposited on a first material layer. Regardless of the number of material depositions, a film comprising a two-dimensional hole/aperture array can be released, with removal of the mask component from the substrate, for subsequent use or application.

Choice of material component is limited only by use in conjunction with a particular deposition technique, providing desired rate and control of material placement. Without limitation, electron beam deposition techniques known in the art can be used with good effect to deposit a variety of metallic and/or magnetic materials, on the mask component. Such materials include, but are not limited to, gold, nickel, silver and combinations thereof. Certain other embodiments can comprise one or more dielectric and/or semiconductor materials, including but not limited to silicon and silicon dioxide, alone or in combination with one or more of the aforementioned materials. With regard to the latter, sequential deposition of one or more additional material components can provide a composite film comprising corresponding material layers.

Such material layer components can be dimensionally-controlled by variation of time and rate of material deposition, to provide desired layer and overall film thickness dimensions. In certain embodiments, an individual material layer component thickness can be about 50 nm or less. Depending upon the total number material layer components and/or individual layer dimension, overall film thickness dimension can be up to about 500 nm or greater.

Accordingly, this invention can also be directed to a free-standing film composite comprising a two-dimensional hole array. Such a composite can comprise a plurality of material layer components comprising a thickness dimension up to about 500 nm or greater, with the composite comprising an inch-scale length dimension, as distinguished from micron-scale dimensions of the prior art. Each hole of the two-dimensional array is without limitation as to shape or configuration, but can have a dimensional aspect ranging from less than 100 nm or about 100 nm to about 250 nm or greater than 250 nm. Regardless, spacing between any such holes, whether uniformly or randomly positioned, can range from about 1 micron to about 25 microns.

Hole shape or configuration, together with dimension and spacing, are limited only by mask fabrication technique and use thereof in material deposition. Without limitation, mask rotation of the sort described more fully below can be used to fabricate a range of hole configurations, from the circular, to the elliptical, or to slit-like. Likewise, holes/apertures of a square, rectangular or other geometrical configuration can also be fabricated. Depending upon initial substrate/mask dimension and one or more of the aforementioned fabrication techniques, such a composite can comprise up to about $10^9$ or more holes/apertures per square inch, such a value depending at least in part on hole/aperture dimension and/or shape/configuration.

Regardless of hole array, such a composite can comprise one or more material layer components, each of which can comprise a thickness dimension limited only by deposition parameters of the type described herein. In certain embodiments, each material layer component of such a composite can be independently dimensioned less than about 75 nm. Material choice can be made as described above. As illustrated below, certain film composites comprising one or more noble metal layer components can be used with good effect. In certain other embodiments, one or more layer components can comprise a dielectric material. Without limitation, one such composite can comprise a dielectric layer component positioned between two metallic layer components.

Accordingly, this invention can also be directed to a method for parallel fabrication of a two-dimensional hole array. Such a method can comprise providing a substrate and a mask component thereon, with the mask component comprising a plurality of holes/apertures therethrough; treating the substrate through the apertures and under the mask component with an anisotropic etchant, to provide a plurality of recesses in the substrate; depositing at least two material components on the mask component, each deposition for at least one of a rate and for a time sufficient to provide a layered film of such material components, with the film comprising a hole array corresponding to the mask component; and removing the mask component to release the resulting film and two-dimensional hole array from the substrate. As can also apply to non-parallel fabrication, such a method can comprise characterizing the optical properties of one or more of the film composite materials and/or the corresponding hole array. Microscopic and/or spectroscopic analyses can comprise illuminating the film and/or hole array with an optical wavelength at least partially sufficient to induce a surface plasmon interaction. Such effects, illustrating related plasmon resonance modes and various other non-limiting applications of this invention, are described more fully below.

BRIEF DESCRIPTION OF THE DRAWINGS

FIGS. 2A-D. Field emission scanning electron microscope (FESEM) images of the key fabrication steps. Clockwise from top left: (A) Cr-mask of 250-nm holes formed by PSP, e-beam deposition, and lift-off. (B) Etched Si(100) pyramidal pits undercutting the Cr-mask in (A). (C) 50-nm film of Ni deposited on (B). (D) Ni pyramids situated in the centers of the etched Si pits after removing the Cr-mask. The dimensions of all the insets are 500 nm×500 nm.

FIGS. 6A-E. Scanning electron microscope (SEM) images of the key manipulation steps. (A) 250-nm diameter Au pyramids situated in the centers of etched Si pits spaced by ~2 µm. (B) Etched Si(100) pedestals supporting the Au pyramids. (C) Au pyramids transferred and partially imbedded within the PDMS film. White lines highlight the pyramidal tip. (D) Etched Si(100) pedestals after removal of the pyramids. The dimensions of all insets are 1 µm×1 µm, and scale bars are 1 µm. (E) Image of a 1-cm$^2$ pyramid array encapsulated in a thin PDMS film. Scale bar is 1 cm.

FIGS. 8A-C. Optical characterizations, as described herein, of Au pyramids in an array whose plane is parallel, (tips perpendicular) to the optical axis of the microscope.

FIGS. 11A-D. Near-field and far-field optical images and calculations. (A) NSOM optical image of holes in a 100-nm thick Au film on glass. The image was acquired at a 200×200 pixel resolution at 5 ms/pixel scan rate using an Al-coated probe (tip aperture ~70 nm, Veeco) with an unknown, but fixed, polarization. Scale bar, 1 µm. (B) Calculated near-field SPP standing wave pattern at the Au/air interface for a given NSOM tip position for four 200-nm diameter holes, on a 1.6 µm×1.6 µm array, and for a 100-nm thick Au film supported on glass. Scale bar, 500 nm. (C) Calculated far-field intensity transmitted into the glass substrate of four holes resulting from separate calculations with the NSOM tip at different positions along the scan line indicated in (D) below. The fringe spacing of $\lambda_{sw} \sim \lambda_{SPP}/2$ is present but is relatively smaller in amplitude compared to the transmission through the holes. (D) Cross-section of two neighboring holes from (A). The standing waves between the holes have a period of $\lambda_{sw} \sim 322$ nm.

FIGS. 14A-B. FIG. 14A depicts a sandwich-type structures of Au/SiO)Au with layer/component thickness of 20/70/20 and 70/20/70; FIG. 14B shows the reflected light from the 20/70/20 (dark) and the reflected light from the 70/20/70 (light).

FIGS. 16A-D. Optical micrograph images of Au film with (A) circular holes, (B) elliptical holes, (C) slit-like holes without polarization, and (D) transmission spectra of a single hole in the array.

FIGS. 17A-H. Optical micrograph images and corresponding LSPR spectra (D and H) of Au film with elliptical holes (top) and slit-like holes (bottom) with different polarization: (A and E) θ=0°, (B and F) θ=45°, (C and G) θ=90°.

FIGS. 19A-B. Transmission spectra for (A) single elliptical and (B) single slit-like hole in Au films (150 nm thick), showing LSPR peak splitting. The curves are slightly offset for clarity.

DETAILED DESCRIPTION OF CERTAIN EMBODIMENTS

Various embodiments of this invention can comprise fabricating free-standing, monodisperse, metallic pyramids from different metals with variable thicknesses. The overall size of these pyramids can be mesoscale (e.g., ranging from about 100-about 300 nm) while their tips can be nanoscale (e.g., ranging from about 1-about 10 nm). Such metallic pyramids can be prepared, for instance, using a combination of phase-shifting photolithography (PSP), wet-chemical etching, and electron (e)-beam deposition. A patterning step can include the use of sub-250 nm holes in a chromium film as both an etch mask and as a deposition mask. In addition, such a methodology can generate multi-layered, pyramidal structures by taking advantage of the layer-by-layer capabilities of e-beam deposition. Such a top-down nanofabrication method can produce anisotropic structures that are monodisperse, highly uniform in shape and size, and multi-functional.

Several other embodiments of this invention can relate to characterization of the orientation-dependent optical properties of two-dimensional arrays of such anisotropic metallic nanoparticles. Such studies are facilitated by methods to encapsulate and manipulate aligned particles with complex three (3D)-dimensional shapes inside a uniform dielectric environment. Using dark field or scattering spectroscopy, the plasmon resonances of, for instance, 250-nm Au pyramidal shells imbedded in a PDMS matrix were investigated. It has been shown that scattering spectra of these particle arrays depend sensitively on the direction and polarization of the incident white light relative to the orientation of the pyramidal shells. Accordingly, this invention presents an approach to manipulate—by hand—ordered arrays of particles over cm²-areas and permits new insight into the relationship between the shape of 3D-particles and their supported plasmon resonance modes.

Figure 1:
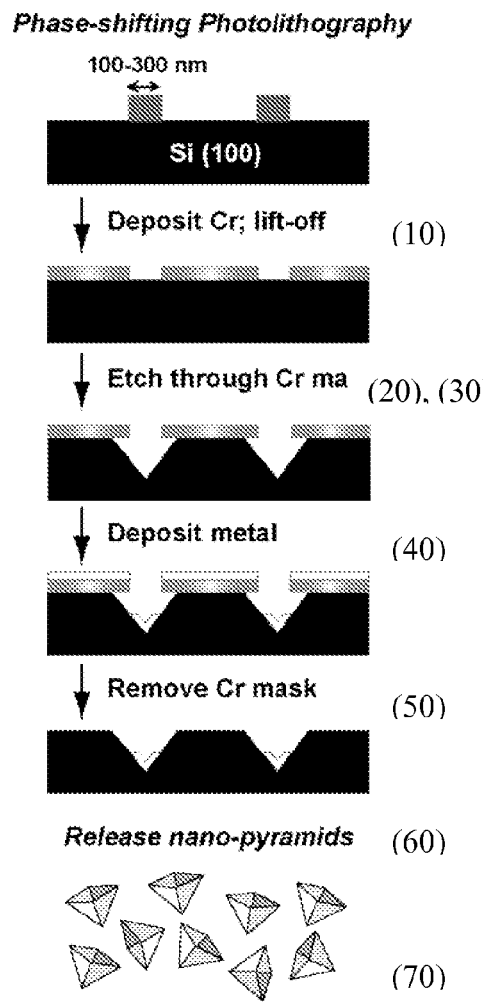
FIG. 1. Scheme depicting fabrication of the free-standing metallic pyramids.

FIG. 1 (together with several subsequent figures) outlines a non-limiting procedure for generating metallic pyramids within the etched pits of a Si(100) substrate, using a Cr-film patterned with sub-250 nm holes as both the etch mask and deposition mask. First, an array (covering ~1 in.²) of photoresist posts (typical diameters ~250 nm; smallest diameters ~100 nm) was patterned (10) on a Si(100) wafer using PSP. In brief, these posts were formed by exposing photoresist (Shipley 1805) through a h-PDMS mask patterned with a square array of dots and removing the exposed resist with 351 Microposit developer. A mask (e.g., 20 nm of Cr) was deposited (20) by e-beam on these photoresist posts, and lift-off (30) of the resist was achieved by sonicating the pattern in acetone. Round holes, with very smooth edges, were formed in the Cr-film (FIG. 2A). See, e.g., E. C. Greyson, Y. Babayan, T. W. Odom, *Adv. Mater.* 2004, 16, 1348-1352; T. W. Odom, J. C. Love, D. B. Wolfe, K. E. Paul, G. M. Whitesides, *Langmuir* 2002, 18, 5314-5320; and T. W. Odom, J. C. Love, V. R. Thalladi, G. M. Whitesides, *J. Am. Chem. Soc.* 2002, 124, 12211-12212, each of which is incorporated by reference in its entirety. Other methods known in the art can also be used with good effect, such methods including e-beam lithography and nanoimprint lithography. Likewise, materials other than Cr (e.g., Ti) can be used for a mask, as would be understood in the art.

Anisotropically etching (140) the exposed silicon with a KOH/isopropyl alcohol (IPA) solution formed pyramidal pits underneath the Cr-nanoholes (FIG. 2B). Undercutting the Cr film provided pyramids smaller than the size of the template of the pyramidal pits. Smoothness and symmetry of the Cr-etch mask can be useful in forming symmetrical pyramidal pits: for instance, oblate or rough Cr-holes produced oblate and/or irregularly shaped pyramids. The Cr-mask was also employed as a mask for deposition (50), and a 50-nm Ni film (e.g., 1-4 Å/s) was evaporated onto these patterns (FIG. 2C). The patterned samples were placed in the evaporator so that they were line-of-sight with the evaporation source (i.e., aligned to avoid shadowing); the film thickness was monitored with a quartz crystal microbalance. The resulting pyramids tend to have smoother facets and are more solid when the material is deposited relatively quickly (e.g., ~0.4-0.5 nm/s) and at pressures less than about $5 \times 10^{-6}$ Torr. Finally, to remove (60) the mask, the Cr-film was etched with a commercial etchant (Transene Corp., Danvers, Mass.) to reveal Ni pyramids (50 nm thick and ~250 nm across their base) situated within the centers of the silicon pyramidal pits (FIG. 2D).

Figure 3A:
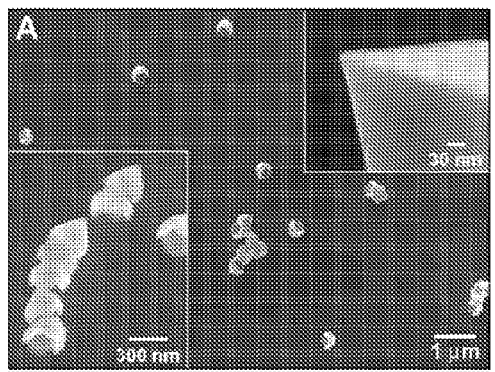
FIGS. 3A-C. FESEM images of metallic pyramids of a single material after removal of the silicon template. (A) 50-nm thick Ni pyramids. (right inset) Zoom-in of a tip with radius of curvature r<10 nm; (left inset) magnetized Ni pyramids that assembled into a chain. (B) 150-nm thick Ni pyramids. (right inset) Zoom-in of a tip with r<10 nm (left inset) Arrow-like particle with smooth facets because of the Si (111) planes of the etched pits and with notches along the shaft that reproduce the edge-roughness of the Cr-mask. (C) 50-nm thick Au pyramids. Inset shows a Au tip with r<8 nm.

In order to release (70) the Ni-pyramids from the silicon template, this pattern was etched with KOH/IPA (FIG. 3A). A patterned area (pyramids spaced 2 µm×2 µm over 1 in.$^2$) in some embodiments generated ~$10^8$ pyramids/in.$^2$. These mesoscale pyramids can be isolated using a ~1 T SmFeB magnet or centrifugation (3000 rpm for 5 minutes). Since Ni is a hard magnetic material, the 50-nm thick pyramids isolated by the strong magnet tended to clump together or to align into chains (FIG. 3A, left inset). Chains formed when the Ni-pyramids were magnetized in the silicon mold; after release, their remnant magnetization assisted in their alignment. Importantly, a majority of the pyramidal tips we observed had a radius of curvature r<10 nm (FIG. 3A, right inset). The facets of the Ni-pyramids are remarkably smooth. Without limitation as to any one theory or mode of operation, it is believed that the exposed, crystalline Si(111) planes of the pyramidal pits can assist in molding and merging the nickel grains as they are deposited onto the surface.

Figure 3B:
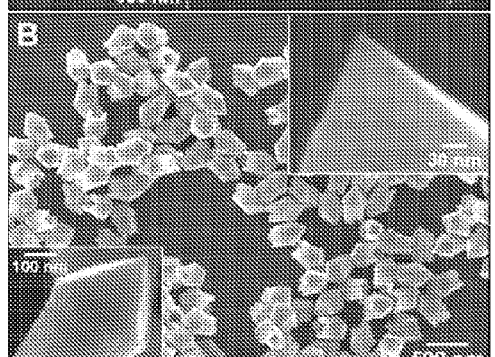
Figure 3C:
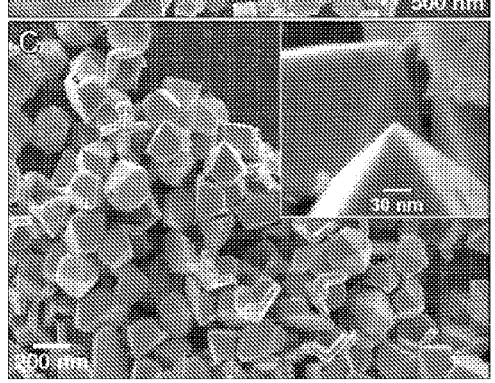

A similar technique was also used to fabricate pyramids with much thicker side-walls; 150 nm of nickel was deposited through the Cr-mask of holes (FIG. 3B). Certain distinct features of these arrow-like particles suggest a possible mechanism of the pyramid formation: (i) the ridges or notches along the shaft of the arrow reproduce exactly the granular structure of the Cr-deposition mask (FIG. 3B, left inset); (ii) the diameter of the shaft becomes smaller along the length of the particle, which indicates that the Cr-holes are decreasing in size; and (iii) the interior of the shaft is grainy because the metal is no longer depositing directly against a smooth surface. Because of their unique shape, these types of three-dimensional particles would be difficult to fabricate by other nanofabrication routes. In addition to Ni-pyramids, 50-nm thick gold pyramids were also fabricated using such a method (FIG. 3C). The smoothness of the facets and the sharpness of the tips (observed tips with r<8 nm) make them ideal structures for studying the local electromagnetic field enhancement of noble metal tips.

Figure 4A:
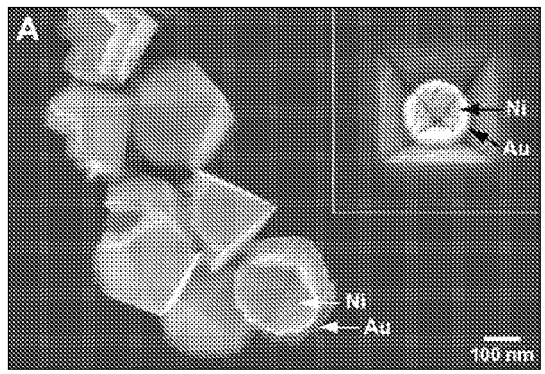
FIGS. 4A-C. FESEM images of pyramids composed of multiple layers. (A) Two-toned pyramids with a 25-nm Au outer shell and a 25-nm Ni inner shell. (inset) Au/Ni pyramid in an etched pit (tilt angle=15°). (B) Three-layer pyramids (Au/Ni/Au) of 10 nm Ni sandwiched between 25 nm of Au (25/10/25). (inset) Multi-layered structure in an etched pit (tilt angle=25°). (C) Au/Ni/Au pyramids with different layer thicknesses of materials: 20/50/20. Inset shows a tip from these structures with r<2 nm.
Figure 4B:
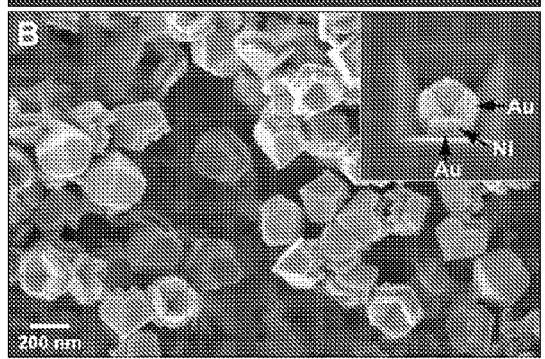
Figure 4C:
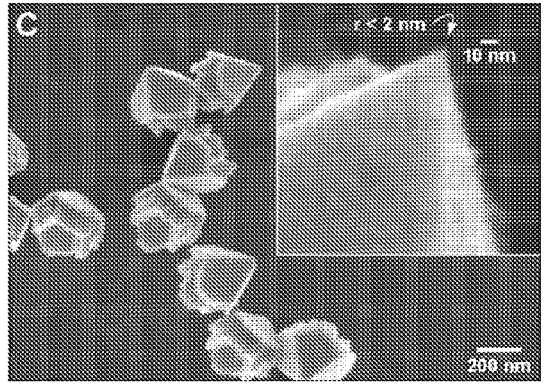

One possible advantage (besides creating nanoscale tips) of the present nanofabrication methodology is the ability to control both the materials and chemical functionality of the pyramids. A layer-by-layer feature of e-beam deposition was used to create multi-layered pyramids of gold and nickel with variable thicknesses. To create representative two-layered pyramids, 25 nm of Au and then 25 nm of Ni were evaporated through the same Cr-deposition mask (FIG. 4A). The inset image (tilted 15°) shows a Au/Ni pyramid before it was removed from the etched Si pit. Such mesostructures can be manipulated with magnetic fields because of their magnetic interior and can easily be chemically functionalized on their outer shell. Three-layer pyramids (Au/Ni/Au, similar to core-shell structures), that responded to a magnetic field and can have two different or orthogonal types of chemical functionality, were also prepared. FIG. 4B shows a 10-nm layer of Ni sandwiched between 25-nm layers of Au (25/10/25). The inset highlights the boundaries between the Ni and Au-layers. Tri-layer pyramids with different thicknesses of Au and Ni were also fabricated (FIG. 4C); remarkably, in these mesostructures, pyramidal tips exhibited radii of curvature r<2 nm (inset).

Figure 5:
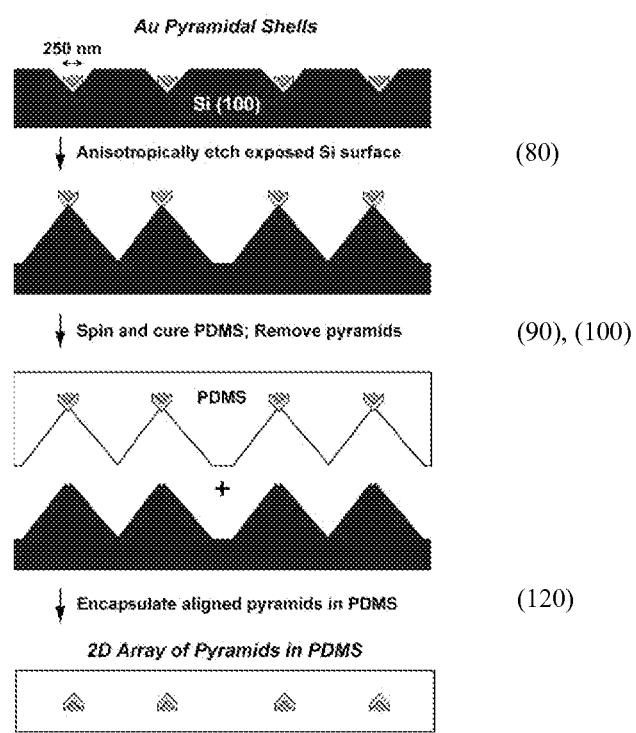
FIG. 5. Scheme depicting the transfer and encapsulation of Au pyramids in a PDMS film.

FIG. 5, with reference to FIG. 1, outlines a procedure for transferring Au pyramids situated within the etched pits of a Si(100) mold into a transparent PDMS film. As a departure from the method of FIG. 1, the Si substrate containing the Au pyramids (FIG. 6A) was treated (80), with an anisotropic Si etch solution. The pyramids acted as etch masks and protected the underlying silicon; the exposed Si(100) surface was etched quickly, leaving the Au pyramids supported on Si pedestals (FIG. 6B). To improve the adhesion between the pyramids and PDMS matrix, the Si substrate was first passivated with tridecafluoro-1,1,2,2-tetrahydrooctyl-1-trichlorosilane (Gelest, Inc.), and the Au pyramids were functionalized with (3-mercaptopropyl)trimethoxysilane (Aldrich). (See, e.g., W. R. Childs, R. G. Nuzzo, Langmuir 2005, 21, 195.) The sample was then contacted (90) with a representative dielectric material: pressed against a thin (10 µm) layer of unpolymerized h-PDMS and cured. (See, e.g., T. W. Odom, J. C. Love, D. B. Wolfe, K. E. Paul, G. M. Whitesides, Langmuir 2002, 18, 5314.) The h-PDMS film (with the Au pyramids now partially imbedded) was pulled (100) off the substrate with tweezers, with the pyramidal tips incorporated within and protruded partially from the PDMS mold (FIG. 6C, inset). The pyramids were shown transferred into PDMS by characterizing the etched Si substrate (FIG. 6D). To encapsulate (120) the Au pyramids fully, the array of pyramidal tips was exposed to the mercaptosilane and then spin-coated a thin (10 µm) layer of h-PDMS on top. FIG. 6E shows a digital display of a large-area PDMS film encapsulating an array of 250-nm Au pyramids.

Figure 7A:
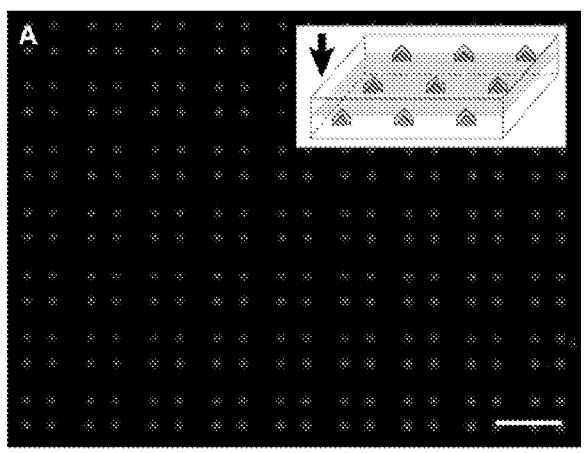
FIGS. 7A-B. Optical characterization of Au pyramids in an array whose plane is perpendicular to the optical axis of the microscope. (A) Dark field (DF) microscope image of encapsulated Au pyramids with tips pointing directly at the white light source. The black arrow in the inset image indicates the direction of the optical axis, and grey area denotes the plane of the particle array. Scale bar is 4 µm. (B) DF spectrum of the array of Au pyramids.
Figure 7B:
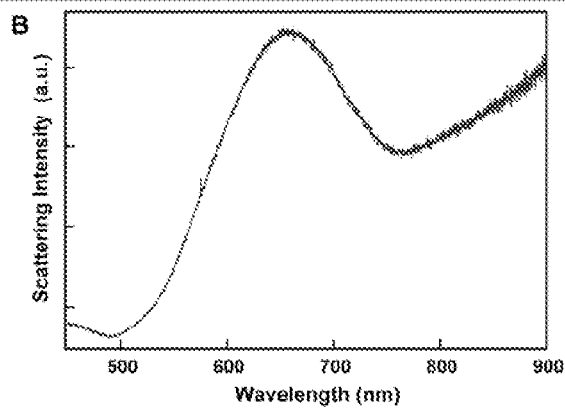

Dark field (DF) microscopy and spectroscopy were used to characterize the optical properties of the pyramidal particles. Excitation of the arrays was achieved by passing unpolarized or polarized white light through a dark-field condenser (NA=0.95). The scattered light from the pyramid array was collected using a 20× objective and then analyzed using a spectrometer coupled to a CCD camera. An array of nanoparticles whose plane was perpendicular to the optical axis of the microscope, and whose tips pointed toward the incident light (FIG. 3A, inset) was first characterized. FIG. 7A depicts a DF microscopic image of an array of red spots that correspond to an array of Au pyramidal particles. Note that because the monodispersity of the pyramids exceeds 95%, the spot sizes of the scattered light are uniform, and the color (red) of every spot is the same. The scattered spectrum obtained with unpolarized white light exhibited a strong peak at red wavelengths (650 nm) and another that appeared to extend into the near-infrared region (FIG. 7B). The optical response of this array did not change, however, when the incident light was polarized because the pyramidal particles in this orientation are symmetric with respect to the optical axis. Also, the scattering spectrum from the same array with tips pointing away from the light source (the film was flipped over) was identical to the spectra in FIG. 7B.

To investigate different orientations of the pyramidal array, using the flexible and soft nature of PDMS, the PDMS film containing the Au pyramidal shells was sliced into thin (500 µm) sections. One of these cross-sections was placed on a glass substrate such that the plane of the nanoparticle array was parallel to the optical axis of the microscope, and where the tips were pointed perpendicular to this axis (FIG. 8A). In this orientation, the illumination wavevector is now in the plane of the pyramid base. The DF image of a thin cross-section of an array (with only the bottom layer of pyramids in the depth of focus) is shown in FIG. 8B. Unpolarized white light excitation (●) produced a scattering spectrum with broad features (FIG. 8C), unlike the situation in FIG. 7, where the plane of the nanoparticle array was perpendicular to the optical axis. Also, since the orientation of the particles was now not symmetric with respect to the incident light, the effects of polarization on their optical properties could be explored. As the polarization vector rotated from being parallel to the pyramid base (▲) to an angle perpendicular to the base (parallel to the tips, ◄), the color of the scattered light shifted from a deep-red to a light-red.

This effect was most clearly pronounced in the scattering spectrum: polarization parallel to the base produced a resonance peak around 750 nm, while polarization perpendicular to the base did not (FIG. 8C). What is interesting is that the spectrum of the former case (polarization parallel to base) is different from the spectrum in FIG. 7C—even though they appear at first glance to be optically equivalent. In both cases the polarization vector was parallel to the pyramid base, although the propagation wavevector was from perpendicular directions.

As discussed above, this invention can provide a simple procedure for fabricating free-standing, or an array of mesoscale metallic pyramids with nanoscale tips. Certain embodiments can produce ~$10^9$ pyramids/in.$^2$ (e.g., limited only by the size of a h-PDMS mask), and hence the density of mesostructures can easily be scaled-up. Other release methods (e.g. mechanical pressure or molding) and the deposition of materials at different rates and temperatures—other than as described herein but as would be known to those skilled in the art and made aware of this invention—can be used to enhance the available benefits and advantages. Because the overall size of these structures is at least in part determined by the diameters of the Cr-holes in the deposition mask, decreasing these diameters can result in sub-100 nm pyramids. In addition, the ability to generate multi-layered pyramids with different types of functionality (including insulating materials) can also be useful. The production of free-standing and isolated noble metal particles with well-defined, ultra-sharp tips now also enables detailed studies of their optical properties (e.g. localized surface plasmon resonance).

As demonstrated, the present invention also provides a technique to align and manipulate arrays of pyramidal nanoparticles within a uniform dielectric environment. With control of the orientation of the particles, it is possible to investigate their orientation-dependent optical properties, which were found to be sensitive to both the illumination wavevector and polarization vector. Most importantly, it is also possible to correlate the orientation and anisotropic shape of nanodimensioned particles with specific multipolar plasmon resonances. Such an understanding of these unusual properties of relatively large plasmonic particles, especially those with sharp tips and edges, can be used to enhance the capabilities of various plasmon-based applications.

Related efforts have led to flexible approach for the fabrication of large-area, free-standing films of subwavelength hole arrays, with demonstrated high optical quality. As relates to such embodiments, the present invention affords at least four advantages over current methods: (i) Use of masters. Masters are high-quality patterns from which many low-cost copies can be duplicated. Inexpensive masters patterned with arrays of subwavelength features in photoresist over 1 in.$^2$ can be generated by phase-shifting photolithography (PSP) Odom, T. W.; Love, J. C.; Thalladi, V. R.; Whitesides, G. M. *J. Am. Chem. Soc.* [2002, 124, 12211-12212; Odom, T. W.; Love, J. C.; Wolfe, D. B.; Paul, K. E.; Whitesides, G. M. *Langmuir* 2002, 18, 5314-5320.], although the procedure is readily applicable to masters prepared by other methods. (ii) Parallelism. For instance, poly(dimethylsiloxane) (PDMS) is cast against a master to form an elastomeric mask, which will be used repeatedly to fabricate arrays of structures. The present method(s) create all the holes in the array simultaneously compared to drilling through a film one hole at a time (e.g., FIB). (iii) Simplicity. The strategy uses widely available lithographic techniques such as photolithography, wet chemical etching, and e-beam deposition. (iv) Flexibility. Multilayered films of hole arrays consisting of noble metals, semiconductor materials and magnetic materials can be fabricated with exquisite control over the thickness of each layer.

Figures 10A, 10B, 10C, 10D, 10E:
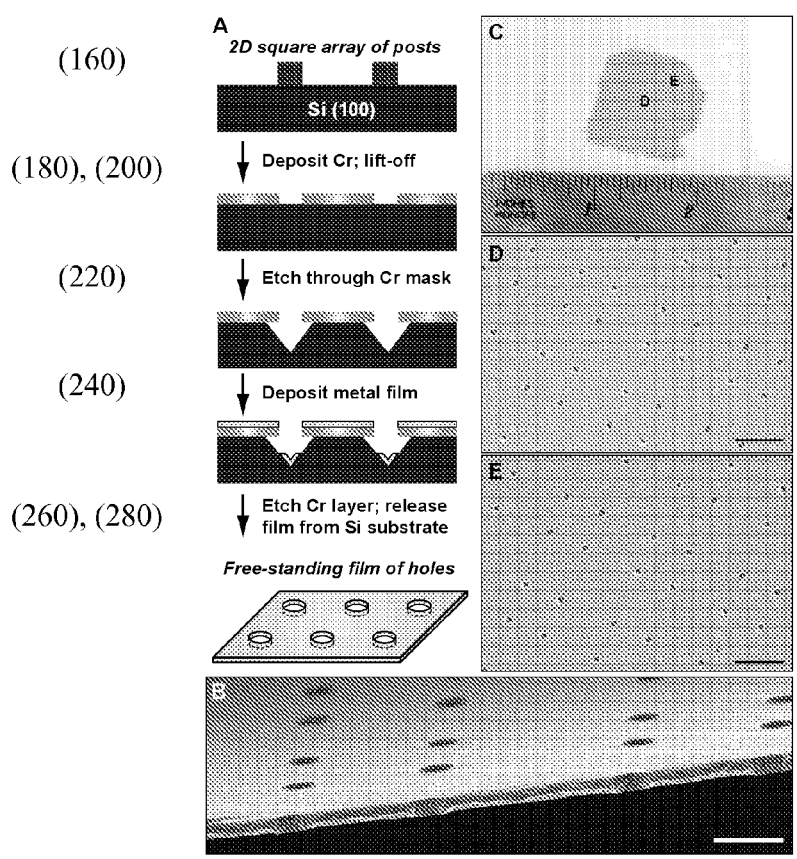
FIGS. 10A-E. Fabrication and structural characterization of large-area hole arrays. (A) Schematic illustration showing preparation of free-standing films of subwavelength hole arrays. (B) SEM image of a portion of a free-standing 100-nm thick Au film perforated with 250-nm diameter holes. Scale bar, 500 nm. (C) Optical micrograph of ~1 in.$^2$ free-standing film placed on a glass substrate. (D) and (E) SEM images of representative areas of the film illustrating the uniformity of the patterning. The holes are spaced 1.6 µm×2.4 µm. Scale bar, 2 µm.

Illustrating certain embodiments of this invention, large-area films of subwavelength hole arrays were prepared in several steps (FIG. 10A). First, a nearly square array of 250-nm circular posts in positive-tone photoresist was patterned (160) on a Si (100) wafer using PSP and a PDMS mask, followed by e-beam deposition (180) of a thin layer of Cr. After removal (200) of the photoresist, the Cr-film was left perforated with round holes having very smooth edges. This Cr-layer has two functions: (i) a template for the hole patterns in the metallic films and (ii) a sacrificial layer to create free-standing films. Next, the exposed Si was anisostropically etched (220) to form pyramidal pits beneath the Cr-holes. This void beneath the holes allows relatively thick films to be created. E-beam evaporation was then used to deposit (240) a single metal or multiple materials of desired thickness (as thick as 500 nm) onto the patterned Cr-film. By etching away (260) the Cr-film, the metallic film of hole arrays was detached (280) from the Si-substrate (FIG. 10B). The free-standing films were then rinsed several times in Milli-Q water and placed on a glass cover slip to dry. FIG. 10C depicts an optical micrograph of a 100-nm thick Au film perforated with 250 nm holes spaced 1.6 µm×2.4 µm; different, representative areas imaged by scanning electron microscopy (SEM) indicate that this large-area array of holes is nearly defect-free (FIGS. 10D and 10E). Unlike most hole arrays fabricated by FIB, the overall topography of these large-area films is flat and very uniform.

To test the optical quality of these films, their properties were investigated using near-field scanning optical microscopy (NSOM). Optically thick Au films having 250-nm holes, sitting on a glass substrate, were analyzed using an NSOM (Aurora III) in illumination mode with Al-coated optical fiber probes. Light (excitation wavelength, $\lambda_{ex}$) from a 633-nm HeNe laser or an 800-nm Ti:Sapphire laser was coupled into the fiber tip near the air/Au interface, and the transmitted light into the glass substrate was collected in the far-field with an avalanche photodiode. Although far-field light intensity is collected, the optical image, constructed by plotting this light intensity as a function of the probe position, provides information about near-field phenomena. Under local illumination of 633-nm light, a 100-nm thick Au film (FIG. 11A) exhibited enhanced transmission at the holes, which can be attributed to the localized SPs (LSPs) of the holes coupling resonantly with the incident light. Interestingly, fringes reminiscent of standing wave patterns were observed between adjacent holes.

Results indicate that light from the NSOM tip is locally exciting surface plasmon polariton (SPP) waves on the film surfaces. [(Hecht, B.; Bielefeldt, H.; Novotny, L.; Inouye, Y.; Pohl, D. W. *Phys. Rev. Lett.* 1996, 77, 1889-1892; Yin, L.; Vlasko-Vlasov, V. K.; Rydh, A.; Pearson, J.; Welp, U.; Chang, S.-H.; Gray, S. K.; Schatz, G. C.; Brown, D. B.; Kimball, C. W. *Appl. Phys. Lett.* 2004, 85, 467-469.] To verify the role of SPPs, we carried out three-dimensional Finite-Difference Time-Domain (FDTD) simulations according to literature procedures. [Chang, S.-H.; Gray, S. K.; Schatz, G. C. *Opt.*

*Comm.* 2005, 13, 3150-3165. Yin, L.; Vlasko-Vlasov, V. K.; Rydh, A.; Pearson, J.; Welp, U.; Chang, S.-H.; Gray, S. K.; Schatz, G. C.; Brown, D. B.; Kimball, C. W. *Appl. Phys. Lett.* 2004, 85, 467-469.] where further technical details may be found. The calculations involved a 100 nm Au film with four holes in a square array (1.6 μm center-to-center distance) with air above and a glass substrate below. A model of the NSOM tip, similar to that used in previous calculations but in illumination mode was also included. The incident wave is a fundamental $TM_{11}$ mode of the NSOM fiber core launched from the upper part of the tip. SPP waves were generated not only on the top Au/air interface but also on the bottom Au/glass interface by the NSOM tip because of the finite thickness of the metal film. The SPPs exhibit a $\cos^2 \phi$ dependence in intensity along the polarization direction of the incident wave. At each NSOM tip location, the far field signal is calculated as the surface integral of the Poynting vector in the downward direction, at a distance away from the Au/glass interface. The near-field pattern is plotted as the total electric field intensity on the Au/glass interface.

Fringes in the calculated near-field intensity appeared on both the top and bottom (FIG. 11B) metal surfaces due to the interference between the SPP waves generated by the tip and the SPPs reflected by the holes. These standing wave patterns are most pronounced when the NSOM tip is located over a position of the SPP wave corresponding to maximum intensity. The fringes produced by the standing wave in the near-field should lead, in the far-field, to intensity maxima with a period ($\lambda_{sw}$) approximately half of the SPP wavelength ($\lambda_{SPP}$=603 nm) at the Au film/air interface (FIG. 11C); indeed, fringes with $\lambda_{sw}$~322 nm, roughly $\lambda_{SPP}/2$, were measured in the experiment (FIG. 11D). The slight difference in the measured period of the fringes and the calculated $\lambda_{SPP}/2$ is not surprising since the fringe pattern follows a Bessel function versus position rather than a $\cos^2$ function. The first few peaks have a somewhat longer peak-to-peak distance. Note that each point of the theoretical result in FIG. 11C represents a separate calculation with the NSOM tip at a different position.

Figures 12A, 12B, 12C:
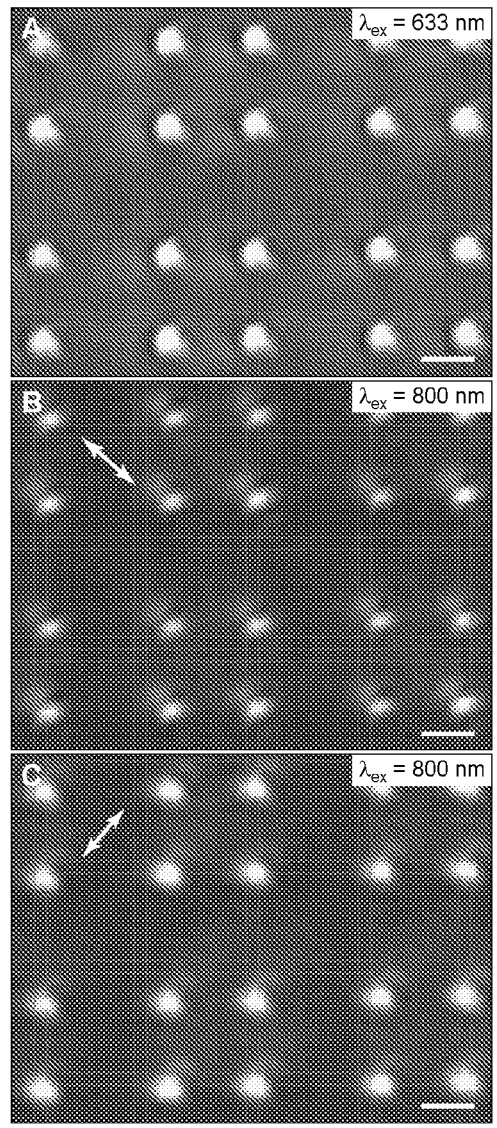
FIGS. 12A-C. NSOM images of 50-nm thick Au films with 250-nm diameter holes illuminated using (A) $\lambda_{ex}=633$ nm and (B) and (C) $\lambda_{ex}=800$ nm light. The use of longer wavelength light effectively increases the thickness of the film, so that SPP standing waves can be observed. The white arrows indicate the polarization direction of the tip. (B) Polarization is parallel to light from the tip. (C) Polarization is perpendicular to light from the tip. All scale bars, 1 µm.

A more quantitative understanding of the NSOM images suggests consideration of both the near-field excitation of the hole and the SPP standing waves surrounding the hole. Without restriction to any one theory or mode of operation, when SPP waves encounter a hole, they are partially reflected back, leading to standing wave formation, and partially converted into far-field light. LSP resonances at the holes are also excited, and if the incident light is close to such a LSP resonance ($\lambda_{ex} \sim \lambda_{LSP}$), far-field scattering is enhanced. This scenario describes what we observed in the 100-nm Au film on glass with 250-nm holes (FIG. 11A), where $\lambda_{LSP}$~630 nm, which is close to $\lambda_{ex}$=633 nm. As the film thickness is decreased, light transmitted directly through the film will dominate in the far-field over that coming from SPP scattering at the holes, and the amplitude of the fringe pattern will decrease significantly or disappear—which was observed in 50-nm Au films (FIG. 12A) using $\lambda_{ex}$=633 nm. Faint fringes were recovered in this 50-nm film using $\lambda_{ex}$=800 nm since less light can penetrate through the Au film at longer wavelengths. Polarization directions were selected relative to the unknown, but polarization of the tip was fixed by placing a polarizer after the film and before the detectors to observe how the orientation of the fringe patterns changed at different polarizations (FIGS. 12B and 12C).

Figure 13A:
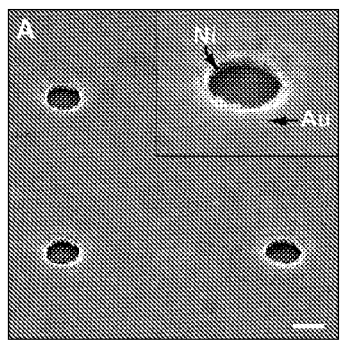
FIGS. 13A-E. Structural and optical properties of bi-layered and multi-layered films. (A) SEM image of holes in a Au/Ni (50 nm/50 nm) film. The tilt angle is 35°. Scale bar, 200 nm. (B) and (C), NSOM images of a Au/Ni film with polarization parallel and perpendicular to the light from the tip. The arrows indicate the direction of polarization; the direction of the fringes rotates along with changes in polarization. Scale bars, 1 µm. (D) SEM image of 200-nm diameter holes in a Au/Ni/Au (40/20/40) film. The tilt angle is 25°. Scale bar, 200 nm. (E) Cross-section of two neighboring holes in a 40/70/40 film imaged under local $\lambda_{ex}=633$ nm and $\lambda_{ex}=800$ nm light. The period $\lambda_{sw}$ of the SPP standing wave between the holes increases as the excitation wavelength increases.
Figure 13B:
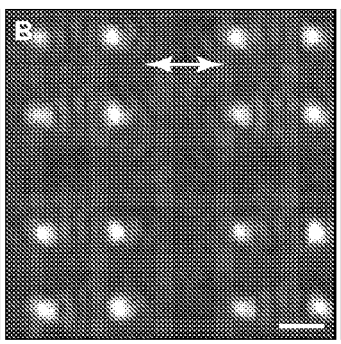
Figure 13C:
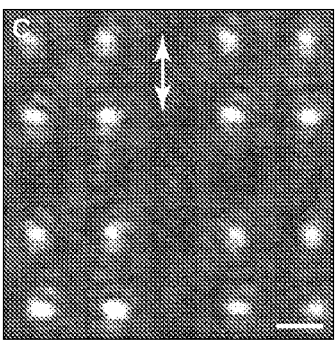
Figure 13D:
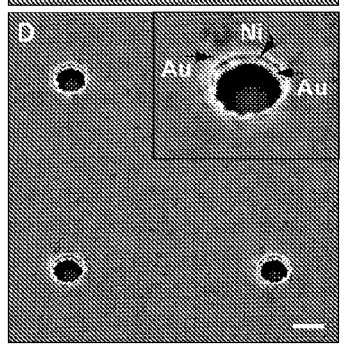

To provide further evidence that the formation of the fringe patterns is a result of interfering SPPs, films of subwavelength hole arrays were constructed from layers of different metals, e.g., Au and Ni (FIGS. 13A and 13D). Ni was chosen because it exhibits a complex dielectric constant different from Au in the wavelengths of the experiments and can function as an absorbing layer. A 100-nm thick bi-layer film made of 50-nm Au and 50-nm Ni (Au/Ni; 50/50) was tested in the NSOM in two different configurations. In the first case, the film was placed on a glass substrate with the Ni side facing up (Au side against glass). No fringe patterns were observed since no SPPs were excited in the Ni film. In the second case, the bi-layer film was placed on glass with the Au side facing up, and standing wave patterns were observed between the holes. Dependence on polarization way was also investigated (FIGS. 13B and 13C), and the directional dependence of the patterns clearly supports that the standing waves can be attributed to SPP propagation combined with scattering from the holes.

Figure 13E:
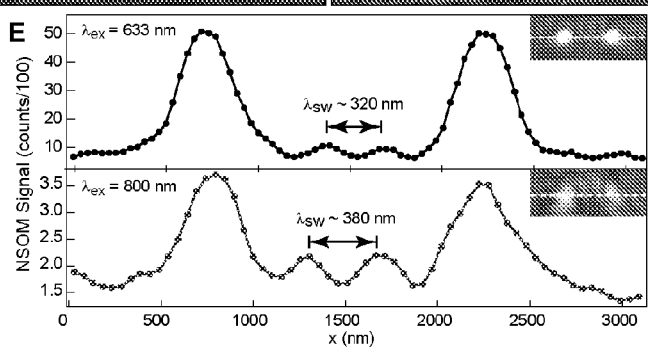

In addition, films of hole arrays of three layers were constructed to show the versatility of this invention. These multilayered films (e.g., Au/Ni/Au) were made up of a Ni core sandwiched between two layers of Au with thicknesses of 40 nm/20 nm/40 nm (40/20/40) (FIG. 13D) and 40/70/40. Under $\lambda_{ex}$=633 nm light, both films exhibited standing wave patterns with a period $\lambda_{sw}$~320 nm (FIG. 13E), nearly identical to the pure Au film case. The 40/70/40 film was also imaged with $\lambda_{ex}$=800 nm ($\lambda_{SPP}$~784 nm) and observed to have fringes with an increased spacing, $\lambda_{sw}$~380 nm, which is ca. $\lambda_{SPP}/2$ at this excitation wavelength (FIG. 13E) and consistent with the present theoretical model.

Films of subwavelength hole arrays containing both metallic and dielectric materials were also fabricated. Compositionally, such nanostructured films are interesting because they combine the properties of a photonic bandgap (all wavelengths outside of the bandgap are transmitted) with the properties of a plasmonic bandgap (opaque to all wavelengths except the plasmon resonance). As previously suggested, dielectric cores of different materials and variable thicknesses can modulate the interaction between the plasmons of multiple layers of metal [E. Prodan, N. Radloff, N. Halas, P. Nordlander, *Science* 302, 419-422 (2003)]. Sandwich-type structures of $Au/SiO_x/Au$ with layer/component thicknesses of 20/70/20 (FIG. 14A) and 70/20/70 were prepared. The reflected light from the 20/70/20 appeared red, while the reflected light from the 70/20/70 appeared yellow (FIG. 14B). The effect of the dielectric core on the plasmon resonance was noticeably apparent in the transmission spectra. The plasmon peak of the 20/70/20 film was shifted to longer wavelengths (~527 nm) compared to the 70/20/70 film (~515 nm), and both were red-shifted compared to films of holes made of Au only (500 nm).

Related techniques can be used to fabricate anisotropic hole arrays in films, with holes over a range of shapes and configurations, including holes with sharp edges and/or of high curvature. Perhaps, surprisingly, such nanostructured films exhibit striking color changes (e.g., from red to green) simply by rotating the polarization of incident light.

As provided elsewhere herein, such a technique can include phase-shifting photolithography (PSP), etching, electron beam deposition, with lift-off of the film. PSP determines the size, shape, and pitch of the nanoholes; etching of the Si-substrate allows the films to be as thick as 500 nm; e-beam deposition provides materials control and thickness control to 1 nm; and lift-off of the film from the Si-substrate in an aqueous etch solution allows the films to be free-standing.

Figures 15A, 15B, 15C, 15D:
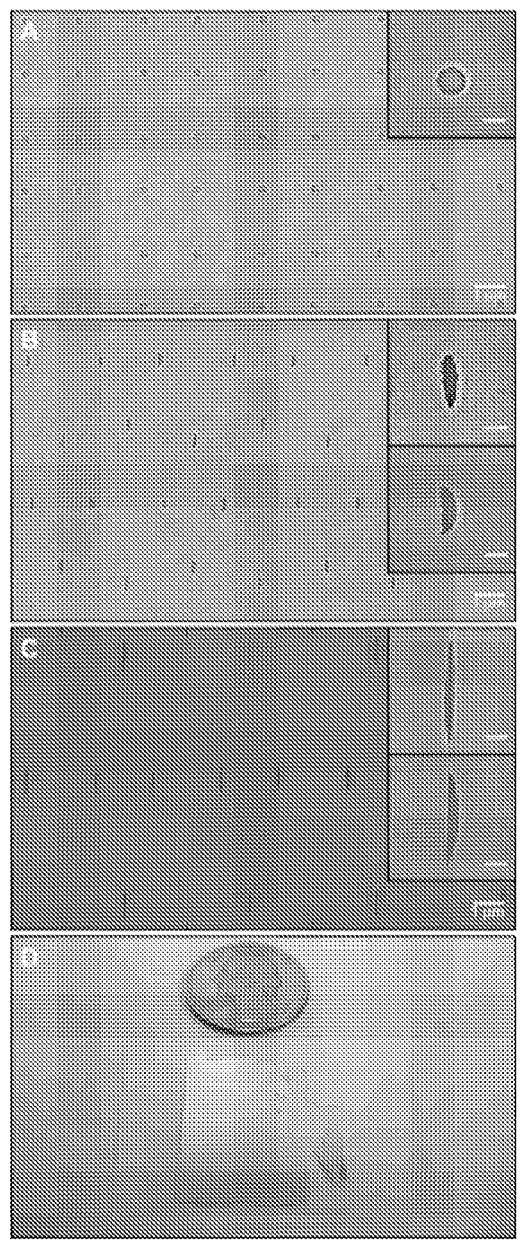
FIGS. 15A-D. Gold hole arrays (films are 150 nm thick) with (A) circular, (B) elliptical and (C) slit-like holes. The scale bars of all insets are 200 nm. (D) Optical micrograph of a free-standing Au nanohole film placed on a glass substrate.

With reference to example 11, arrays of circular, elliptical and slit-like holes were fabricated in an Au film. Circular holes did not exhibit any effects as the polarization was rotated from 0° to 90°. This result is expected because of the symmetry of the hole. Circular hole resonances exhibit a broad peak centered around $\lambda_{hole}$=700 nm (FIG. 16A). Unpolarized light excitation of elliptical and slit-like holes also exhibited broad peaks in the transmission spectra that were similar to the spectra for circular holes (FIGS. 16B-C). Detailed inspection of FIG. 15 indicates that elliptical and slit-like holes arrays exhibit two different hole shapes—asymmetric and symmetric—because of the fabrication procedure. This subtle structure, however, did not affect the spectra acquired from single holes.

Polarization-dependent studies were conducted on the elliptical and slit-like hole arrays. As the polarization vector was rotated (θ is defined as the angle between the long axis of the hole and the polarization vector) from 0° to 90°, a dramatic color change from green to red (orange or magenta) was observed, presumably because of the selective excitation of different plasmon modes. The general trends observed were: (i) resonances that were excited at higher energies (near 500 nm) and lower energies (near 850 nm) when the polarization vector was parallel to the long axis (θ=0°); (ii) a broad resonance that was centered around 700 nm when the polarization vector was perpendicular to the long axis (θ=90°); and (iii) mixed resonances that were composed from a mixture of peaks.

In elliptical holes, the color of the transmitted light changed from green (at θ=0°) to greenish-blue (at θ=45°), to red (at θ=90°) (FIGS. 17A-C). Spectra were acquired from individual holes (single hole spectroscopy) (FIG. 17D). Likewise, trends observed were: At θ=0°, the intensity of the asymmetric peak around 500 nm was higher than one at 850 nm, which is why the gold film appears green; At θ=45°, a combination of three peaks were observed; the ones around 500 nm and 700 nm were of similar intensities; and At θ=90°, the intensity of the broad peak around 700 nm was higher than the peak near 500 nm, and hence the films appeared reddish or magenta.

Similarly, slit-like holes also exhibited different colors depending on polarization. Although the overall colors were different (greener contributions are less), the same trend was observed: at θ=0°, the gold film is green; at θ=45°, the gold film is a greenish orange; and at θ=90°, the film appears reddish-orange. This striking polarization-dependent color change of gold films with anisotropic nanoholes indicates that passive metallic films can become active ones. Such unique properties can contribute significantly to applications such as optical nanoscale devices and biological and chemical sensors.

Figures 18A, 18B, 18C, 18D:
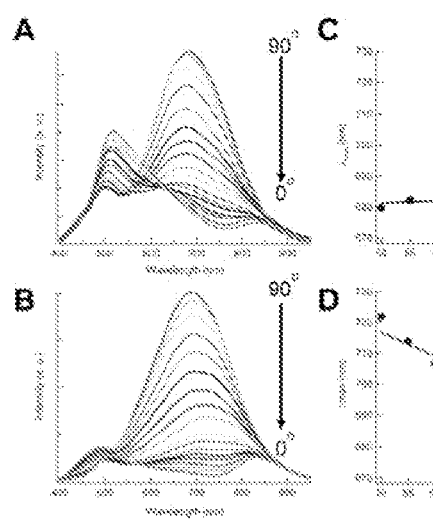
FIGS. 18A-D. Polarization effects on the LSPR spectra of (A) single elliptical hole and (B) single slit-like hole in Au films (150 nm thick) obtained at 5° intervals from 0° to 90°, and corresponding plots of LSPR peak from 50° to 90° for (C) single elliptical hole and (D) single slit-like hole.

To obtain more detailed information on how the polarization wavevector affects the hole resonances, transmission spectra at intermediate polarization angles (every 5°) were measured (FIGS. 18A and 18B). At θ=90°, the hole resonances of elliptical holes were located at higher energies (684 nm) compared to slit-like holes (692 nm), which is consistent with a previous result that the hole resonance red-shifted as the aspect ratio increased. (See, Kuipers, *Phys. Rev. Lett.*, 92, 183901.) For elliptical holes, as the polarization direction was rotated from θ=90° to 50°, the position of the resonance peak was fixed around 680 nm (FIG. 18C). Unlike elliptical holes, slit-like holes exhibited large changes in the peak location as the polarization was rotated from 90° to 50°. The resonance shifted from 688 nm at θ=90° to 721 nm at θ=50°. This linear peak shift is ca. 0.74 nm/1° (FIG. 18D).

The most interesting peak structure for anisotropic hole arrays occurred when the polarization direction was at low angles. FIG. 19 shows how the peak resonances split for elliptical holes (from θ=35° to 15°) and slit-like holes (from θ=35° to 5°). Both elliptical and slit-like holes exhibited splitting and shifting of the dominant peak at 90° (700 nm), but the slit-like holes had larger blue- and red-shifts compared to elliptical holes. For elliptical holes, the peak at θ=35° shifted to ~630 nm at θ=20°, until it could no longer be distinguished from the tail of the peak around 500 nm. Slit-like holes exhibited simultaneous blue-shifting and red-shifting of peaks as the polarization angle was reduced from θ=35° to 20°: the peak at 706 nm blue-shifted to 670 nm and the peak at 787 nm red-shifted to 826 nm. Also, the 706-nm resonance continued to blue-shift and decreased in intensity as the polarization angle was decreased to 0°, until it either disappeared or overlapped with the interband transition peak of gold at 500 nm. The other peak only red-shifted slightly to 831 nm at θ=0°.

Such results demonstrate large-area and free-standing films (e.g., Au and other metals) of nanohole arrays with different shaped holes using simple fabrication methods of the sort described herein. Strong polarization-dependent color was observed and easily controlled by simply changing the aspect ratio of the holes. Likewise, peak-splitting of different resonant modes was observed suggesting by changing the shape of the holes and the polarization direction, that holes may indeed be more interesting than particles as such studies continue.

EXAMPLES OF THE INVENTION

The following non-limiting examples and data illustrate various aspects and features relating to the methods and/or composites of the present invention, including the preparation of nanodimensioned pyramidal particulates and fabrication of corresponding composites comprising two-dimensional hole arrays, as are available through the synthetic techniques described herein. In comparison with the prior art, the present methods and composites provide results and data which are surprising, unexpected and contrary thereto. While the utility of this invention is illustrated through the use of several substrates, masks, deposited materials and pyramidal particulates prepared therefrom, it will be understood by those skilled in the art that comparable results are obtainable with various other substrates, masks, deposited materials, films and hole arrays, as are commensurate with the scope of this invention.

Example 1

Fabrication of Arrays of Au Pyramidal Particles: With reference to examples 2-4, phase-shifting photolithography was used to generate arrays of 250-nm diameter posts in positive-tone photoresist (Shipley 1805) on Si(100) wafers. Cr (10 nm) was evaporated on the posts (Kurt J. Lesker, PVD-75 E-beam Evaporation System), and the resist was removed by sonicating the pattern in acetone to reveal round holes in the Cr film. Pyramidal pits were formed beneath the holes by etching the exposed Si with an anisotropic etchant (23 g KOH, 33 mL isopropyl alcohol, in 100 mL $H_2O$ at 72° C.). 50-nm of Au was evaporated on this pattern, and then the Cr film was removed using commercial etchant (Transene Corp., Danvers, Mass.) to reveal the Au pyramidal particles within the Si pits.

Example 2

Procedure for making a Phase-Shift Photolithography (PSP) dot mask: A master pattern used to generate a PSP dot mask can be fabricated by any method known in the art that satisfies two criteria: (1) the diameter of the patterned posts should be less than half the wavelength of the light exposure and (2) their height should be equal to the exposure wavelength. (See, e.g., U.S. Pat. No. 6,753,131, the entirety of which is incorporated herein by reference.) Here, the pattern is spincoated with a thin layer of commercially available hard PDMS (Gelest, Inc.: e.g., a mixture of 3.4 g VDT-731, 10 mg 2,4,6,8-tetramethyltetravinyl cyclotetrasiloxane, 8.2 mg of Pt-divinyltetramethylsiloxane, 1.0 g HMS-301) for 40 seconds at 1000 rpm and then placed in a vacuum dessicator for 2 minutes at 2 mTorr. This pattern is then cured at 70° C. for 2 minutes in an oven before being coated with a 1 millimeter thick layer of 184-PDMS (Dow Chemicals), and cured for an additional 1.5 hours. After the h-PDMS/184-PDMS composite PSP mask is removed from the pattern, it can be used in subsequent photolithography steps.

Example 3

Procedure for making arrays of photoresist dots (posts): A thin film of a photoresist is spincoated onto a Si (100) wafer such that its thickness is ~450 nm. The recess side of the PSP mask is brought into contact with the photoresist/Si wafer sample and then exposed to UV light for 6 seconds. After the mask is removed, the wafer sample is immersed in 351 developer (Rohm and Haas, Inc.) for 5 seconds, immediately rinsed with water, then dried under a stream of nitrogen. This procedure is optimized so that the photoresist dots are round and greater than 200 nm in height.

Example 4

Procedure for making pyramids: The array of photoresist dots is placed in an electron beam (e-beam) evaporator such that it is oriented line-of-sight to the material source. A 10-nm layer of chromium is deposited on the array, and the photoresist is removed by sonicating the pattern in acetone for 1 minute. The chromium film is thin so that the photoresist dots remove very cleanly, leaving behind an array of round holes in the chromium film on the Si(100) wafer. The sample is then put in an anisotropic Si etch (e.g., 23 g potassium hydroxide, 100 mL water, 33 mL isopropyl alcohol) at 72° C. for 3 minutes and immediately rinsed with water. This sample is now ready to act as the pyramid template in subsequent steps.

This pyramid template is placed in the e-beam evaporator, again line-of-sight, and an appropriate material (e.g., Au and/or Ni) is deposited on it. The Cr film is etched away using an available Cr etchant (Transene Corp.), and the hole film is removed to reveal the pyramids in Si pits.

Figure 9:
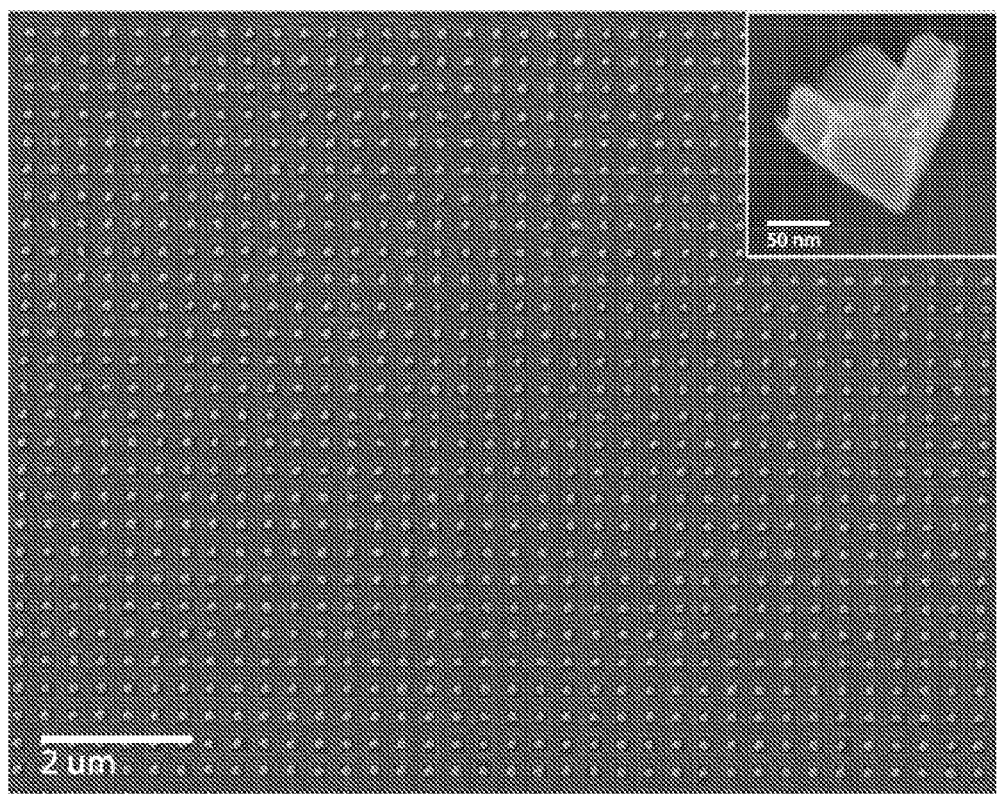
FIG. 9. An SEM image of a pattern of fabricated Au pyramids, at 4×10$^9$ particulates per square inch.

Such procedures can be used to prepare 100 nm basal-dimensioned Au pyramids spaced by 400 nm (center-to-center). Ability to increase pattern density permits generation of about $4 \times 10^9$ pyramid particulates per square inch of pattern. (See, FIG. 9.) Experiment and numerical calculations show such smaller pyramids are more robust than their larger counterparts and provide different light-scattering properties.

Example 5

Encapsulation of Au Pyramidal Particle Arrays in PDMS: Substrates with arrays of Au pyramids within Si pits were exposed to an anisotropic Si etch for about 2.5 minutes, such that Au pyramids could be supported on the resulting Si pedestals. Then, the Si was passivated with tridecafluoro-1,1,2,2-tetrahydrooctyl-1-trichlorosilane (Gelest, Inc.) for ~90 min. The Au pyramids were functionalized by immersing the pattern in a 3 mM solution of (3-Mercaptopropyl)trimethoxysilane (MPTMS, Aldrich) for 30 sec and washing with deionized water and ethanol. This pattern was placed in a solution of mM HCl for 15 min and rinsed again with deionized water and ethanol. (W. R. Childs, R. G. Nuzzo, supra, 2005) Next, the pattern was pressed into a thin layer of unpolymerized h-PDMS (T. W. Odom, J. C. Love, D. B. Wolfe, K. E. Paul, G. M. Whitesides, supra, 2002) that was supported by a 0.5 mm-layer of Sylgard 184-PDMS. Before curing in an oven at 70° C. for 30 min, the sample was placed into a dessicator (10 min) to remove air bubbles. Removal of the Si pedestal substrate revealed Au pyramid arrays partially encapsulated in h-PDMS. The exposed Au tips were functionalized with MPTMS prior to encapsulation with h-PDMS.

Example 6

Manipulating the Orientation of the Au Pyramidal Nanoparticle Array: Arrays of pyramids whose tips were pointed toward the light source and whose plane was perpendicular to the optical axis of the microscope was achieved by simply placing the PDMS film flat on the sample stage beneath the condenser. Arrays of pyramids whose tips were pointed perpendicular to the light source and whose plane was parallel to the optical axis was achieved by slicing a thin cross-section (~500 µm) of the PDMS film/pyramid array and rotating it 90°. The scattering spectra for this orientation were taken only from the bottom layer of the array.

Example 7

Optical Characterization: Scattering spectra were collected with an inverted microscope (Eclipse TE-200, Nikon) using a standard transmission dark field (DF) setup. Collimated white light (Halogen) was passed through a DF condenser (NA=0.8-0.95) equipped with a rotatable polarizer so that the incident light could be polarized at certain angles with respect to the particle array. Some of the light passing through the condenser acquires a component perpendicular to the sample. Blocking this component did not affect the spectral response; therefore, omitting this step, it was assumed that most of the deflected light incident on the particle arrays maintained a polarization similar to the one as before the condenser. The light scattered from the sample was collected with a 20x objective (NA=0.75) and focused onto a Czerny-Turner spectrometer (Triax 552/LN-Cooled CCD, Horiba Jobin Yvon, Inc.). The scattering data was corrected by subtracting the PDMS background and then dividing by the spectrum of the white light source.

Example 8a

Fabrication of subwavelength hole arrays. Nearly square arrays (covering ~1 in.$^2$) of photoresist posts (either 200 or 250 nm in diameter) were patterned on Si (100) wafers using phase-shifting photolithography. (See, T. W. Odom, V. R. Thalladi, J. C. Love and G. M. Whitesides, JACS 2002, 124, 12112, incorporated herein by reference in its entirety; and several of the previous descriptions and examples.) In brief, these posts were formed by exposing a thin (400 nm) layer of positive-tone photoresist (Shipley 1805) through a h-PDMS mask patterned with 1.6-µm×2.4-µm square arrays of recessed posts 200 or 250 nm in diameter. The photoresist was then developed with 351 Microposit to reveal photoresist posts 200-250 nm in diameter and ~400 nm tall. 20 nm of Cr was deposited by e-beam deposition on these photoresist posts, and lift-off of the resist was achieved by sonicating the pattern in acetone. Circular holes having very smooth edges were formed in the Cr-film. Next, the exposed silicon was anisotropically etched with a KOH/isopropyl alcohol solution to form pyramidal pits underneath the Cr-holes. E-beam was used to deposit metallic films of various thicknesses and compositions onto these patterns. The patterned substrates were situated in the e-beam evaporator so that they were line-of-sight with the evaporation source.

Example 8b

The Cr-film was etched away with a commercial etchant (Transene Corp., Danvers, Mass.) and then submerged the sample in several changes of MilliQ water. The sample was then gently agitated in MilliQ water so that the films lifted-off the Si-wafer: raising a corner of this film to the surface of the water until capillary forces were able to support it at the surface of the water. In approximately 1 hour, the remainder of the film floated to the surface of the water without any assistance. The film was placed on a glass cover slip and allowed to dry in a desiccator for 24 hours.

Example 9

Calculation of the SPP wavelength. Conventional SPPs on a metal film/dielectric interface propagate in the plane with wave vector magnitude (See, H. Raether, *Surface Plasmon on Smooth and Rough Surfaces and on Gratings*, (Springer-Verlag, New York, 1988)

$$k_{SPP} \approx \frac{\omega}{c}\left(\frac{\varepsilon_{Au}\varepsilon_d}{\varepsilon_{Au}+\varepsilon_d}\right)^{1/2}$$

The SPP wavelength is $$\lambda_{SPP} \approx \lambda_{ex}\left(\frac{\varepsilon_{Au}+\varepsilon_d}{\varepsilon_{Au}\varepsilon_d}\right)^{1/2}$$

At $\lambda_{ex}$=633 nm, the dielectric constant for Au ($\varepsilon_{Au}$) =16.07+i 1.294 and air ($\varepsilon_D$)=1, and $\lambda_{SPP}$=612 nm. At $\lambda_{ex}$=800 nm, $\varepsilon_{Au}$=27.97+i 1.962 and $\varepsilon_d$=1, and $\lambda_{SPP}$=786 nm. $\lambda_{SPP}$ was estimated by inserting the real part of $\varepsilon_{Au}$ into the formula.

In the Drude model $$\varepsilon_{Au}(\omega) = \varepsilon_\infty - \frac{\omega_D^2}{\omega^2 + i\gamma_D\omega}$$

where for Au between (500-1000 nm), the best fits are ($\varepsilon_\infty$, $\omega_D$, $\gamma_D$)=(11.4577, 9.4027 eV, 0.08314 eV). (S.-H. Chang, S. K. Gray, G. C. Schatz, *Opt. Express* 2005, 13, 3150.)

| | $\lambda_{ex}$ (nm) | $\epsilon$ (Real) | $\epsilon$ (Img) | $\lambda_{SPP}$ (in air) |
|---|---|---|---|---|
| Exp | 632 | −16.0735 | 1.294045 | 612 |
| Drude | 632 | −11.4429 | 0.969844 | 603 |
| Exp | 800 | −27.9703 | 1.961982 | 785 |
| Drude | 800 | −25.1966 | 1.96495 | 784 |

Example 10

Calculation of the Single Hole Spectrum. In an FDTD calculation, the total transmission spectra $T_{tot}(\lambda)$ is calculated by constructing the surface integral of the outward Poynting vector on a surface above the hole with incident light launched below the film. (S.-H. Chang, S. K. Gray, G. C. Schatz, *Opt. Express* 2005, 13, 3150.) The transmission spectra are obtained by subtracting out the transmission spectrum $T_{film}(\lambda)$ for the case of a pure film with no holes from the total transmission spectrum, and normalizing by the incident power over the hole $$T(\lambda)=[T_{tot}(\lambda)-T_{film}(\lambda)]/(I_{inc}\pi a^2)$$

where $I_{inc}$ is the incident intensity and a=d/2 is the hole radius.

For a single hole with diameter of 200 nm in 100-nm Au film, the transmission maximum is ~630 nm. Calculations with different system parameters indicate that the position of the transmission maximum red-shifts with increasing hole-diameter, and blue-shifts with increasing film thickness.

Example 11

Large-area films of holes with different aspect ratios were generated. Such shapes were first fabricated in positive-tone photoresist by performing two exposures through phase-shifting PDMS masks patterned with 2-μm lines spaced by 2-μm. The second exposure was performed through the line-mask after rotating to a specific angle (φ). Different aspect ratio holes can be produced by rotating the mask from φ=1° to φ=90°. (See, e.g., E. C. Greyson et al, *Adv. Mater.*, 2004, 16, 1348, incorporated herein by reference in its entirety.) Here, representative of such a technique in conjunction with this invention, optical properties of three holes with different shapes were examined: (i) square array with 270-nm diameter circular nanoholes spaced 1.8×2.2 μm apart (φ=90°, FIG. 15A), (ii) 65-nm and 230-nm elliptical nanoholes spaced 1.9×2.3 μm apart (φ=45°, aspect ratio of 3.5, FIG. 15B), and (iii) 40-nm and 450-nm slit-like nanoholes spaced 1.8×2.2 μm apart (φ=15°, aspect ratio of 10.6, FIG. 15C). The area of each hole: 57300 nm² for circular, 47000 nm² for elliptical, and 56500 nm² for slit-like holes.

Arrays of elliptical and slit-like hole films have two different shapes, one that is symmetric and one that is asymmetric. Compared to elliptical holes generated by FIB—which usually show large radii of curvature—the elliptical and slit-like holes generated herein have sharp corners with small radii of curvature. The hole shapes were uniform over large areas (~1 in.², FIG. 15D). Films were deposited (e.g., Au) as described elsewhere. Likewise, other materials, alone or in combination with one another can also be deposited.

As demonstrated, above, this invention provides a flexible and parallel route to generate large-area, free-standing films of subwavelength hole arrays. The method aspects materials-general, and from a compositional perspective, multi-layered films of different materials can be constructed. The optical quality of the resulting films was tested using a near-field scanning optical microscope, which revealed the formation of surface plasmon standing wave patterns consistent with numerical simulations. Because the properties of the holes and the film materials can be easily tailored, new types of plasmonic and photonic devices can be envisioned and tested.

We claim:

1. A method for parallel fabrication of a free-standing two-dimensional through-hole array, said method comprising:
   providing a substrate and a mask component thereon, said mask component comprising a plurality of apertures therethrough;

treating said substrate through said apertures and under said mask component with an anisotropic etchant, to provide a plurality of recesses in said substrate;

depositing at least two material components on said mask component, each said deposition for at least one of a rate and a time sufficient to provide a layered film of said material components on said mask component, said layered film comprising a through-hole array; and removing said mask component and releasing said layered film from said substrate to provide said free-standing two-dimensional through-hole array.

2. The method of claim 1 comprising electron beam deposition of said material components.

3. The method of claim 1 comprising characterizing optical properties of at least one of said at least two material components and said through-hole array.

4. The method of claim 3 comprising at least one microscopic and spectroscopic analyses of at least one of said at least two material components said through-hole array.

5. The method of claim 4 comprising illuminating said through-hole array with an optical wavelength at least partially sufficient to induce a surface plasmon interaction therewith.

* * * * *